(12) United States Patent
Ragan et al.

(10) Patent No.: US 8,511,460 B2
(45) Date of Patent: Aug. 20, 2013

(54) CONVEYOR BELT APPARATUS INCLUDING MAGNETICALLY ACTUATED ROLLERS

(75) Inventors: Bryant G. Ragan, Metairie, LA (US); Brien G. Rau, Jefferson, LA (US); Jason Lagneaux, River Ridge, LA (US); Wayne A. Pertuit, Jr., Westwego, LA (US)

(73) Assignee: Laitram, L.L.C., Harahan, LA (US)

( * ) Notice: Subject to any disclaimer, the term of this patent is extended or adjusted under 35 U.S.C. 154(b) by 475 days.

(21) Appl. No.: 12/725,173

(22) Filed: Mar. 16, 2010

(65) Prior Publication Data

US 2010/0230245 A1 Sep. 16, 2010

Related U.S. Application Data

(60) Provisional application No. 61/160,419, filed on Mar. 16, 2009.

(51) Int. Cl.
*B65G 17/24* (2006.01)
*B65G 47/244* (2006.01)

(52) U.S. Cl.
USPC ............ 198/449; 198/619; 198/782; 198/805

(58) Field of Classification Search
USPC .......................... 198/619, 729, 782, 783, 805
See application file for complete search history.

(56) References Cited

U.S. PATENT DOCUMENTS

| | | | |
|---|---|---|---|
| 4,234,076 A | | 11/1980 | Spodig |
| 5,318,167 A | * | 6/1994 | Bronson et al. ............... 198/577 |
| 5,404,997 A | * | 4/1995 | Schreier et al. ............... 198/779 |
| 5,749,454 A | | 5/1998 | Layne |
| 6,244,427 B1 | * | 6/2001 | Syverson ....................... 198/788 |
| 6,378,694 B1 | * | 4/2002 | Onoyama et al. ......... 198/781.06 |
| 6,415,914 B2 | * | 7/2002 | Itoh et al. ................. 198/781.06 |
| 6,494,312 B2 | | 12/2002 | Costanzo |
| 6,571,937 B1 | * | 6/2003 | Costanzo et al. ............. 198/779 |
| 6,854,592 B2 | * | 2/2005 | Fukuoka ....................... 198/788 |
| 7,040,478 B2 | * | 5/2006 | Ehlert ....................... 198/370.09 |
| 7,086,524 B2 | * | 8/2006 | Hayashi et al. ............... 198/788 |
| 7,097,029 B2 | | 8/2006 | Halang |
| 7,461,739 B2 | | 12/2008 | Fourney |
| 7,565,965 B2 | * | 7/2009 | Swoboda ....................... 198/788 |
| 7,878,319 B2 | * | 2/2011 | Costanzo et al. ......... 198/457.02 |

(Continued)

FOREIGN PATENT DOCUMENTS

| | | |
|---|---|---|
| GB | 2284105 A | 5/1995 |
| WO | 2010008756 A1 | 1/2010 |

OTHER PUBLICATIONS

ISA/EP, International Search Report and Written Opinion of the International Searching Authority in PCT/US10/27500, European Patent Office, Jun. 22, 2010, Rijswijk, NL.

(Continued)

*Primary Examiner* — Douglas Hess
(74) *Attorney, Agent, or Firm* — James T. Cronvich

(57) ABSTRACT

A modular conveyor belt and method provides a conveyor belt having rollers with metallic or magnetic rotors. A magnet or metallic element next to the conveyor belt is positioned to rotate the rotor. A magnetic field produced by the magnet or by the magnetic rotor rotates the rollers as they pass the magnetic field or as the magnetic field is changed. In one embodiment, the magnetic field is in the form of one or more switched reluctance motors.

18 Claims, 25 Drawing Sheets

(56) References Cited

U.S. PATENT DOCUMENTS 7,987,970 B2 * 8/2011 Schwesig ............... 198/788
8,123,021 B2 * 2/2012 Depaso et al. ........ 198/370.09
8,167,118 B2 * 5/2012 Fourney ................. 198/779

OTHER PUBLICATIONS

Search Report and Written Opinion in Singapore Patent Application No. 201106188-4, prepared by the Danish Patent and Trademark Office, mailed by IPOS Singapore Dec. 11, 2012.

* cited by examiner

CONVEYOR BELT APPARATUS INCLUDING MAGNETICALLY ACTUATED ROLLERS

CROSS-REFERENCE TO RELATED APPLICATIONS

This application claims the priority of U.S. Provisional Patent Application No. 61/160,419, filed Mar. 16, 2009, and incorporated herein by reference.

BACKGROUND OF THE INVENTION

1. Field of the Invention

The present invention relates to conveyor belts, more particularly to conveyor belts having rollers that provide material handling functions such as product diversion, sorting, singulation, separation, orientation, and acceleration. More particularly, the present invention relates to an improved conveyor belt apparatus that employs magnetically actuated rollers that rotate to perform a selected material handling function.

2. General Background of the Invention

Conveyor belts are used to move articles, packages, food items, machine parts, and the like from one locale to another, such as within a factory, plant, manufacturing facility or the like. In some cases, it is necessary to transfer a package, article, or other item from one conveyor belt to a discharge point or from one conveyor belt to another conveyor belt. There are many such material-handling functions associated with conveyor belts.

Patents have issued that are directed to conveyor belts having special material handling functions. Some patents listed below use magnets to hold a conveyor down in turns or for tracking (i.e., keeping it from sliding to one side or the other). The TABLE is a listing of examples of such patent documents. The listing is in numerical order. Otherwise, the order of listing has no significance. The following U.S. Patent Publications are incorporated herein by reference:

TABLE

| U.S. Pat. No. | TITLE | ISSUE DATE |
| --- | --- | --- |
| 3,179,240 | Belt Conveyor and Magnetic Training Means | Apr. 20, 1965 |
| 4,892,186 | Clock Conveyor Provided with a Plurality of Entrainment Members | Jan. 09, 1990 |
| 5,394,991 | Conductive Material Sorting Device | Mar. 07, 1995 |
| 6,085,896 | Chain Conveyor Track of High-Grade and Low-Grade Plastic | Jul. 11, 2000 |
| 6,129,201 | Curved Element for Magnetic Chain Conveyor and a Conveyor Comprising Said Element | Oct. 10, 2000 |
| 6,155,406 | Magnetic Guide | Dec. 05, 2000 |
| 6,494,312 | Modular Roller-Top Conveyor Belt with Obliquely-Arranged Rollers | Dec. 17, 2002 |
| 6,510,941 | Device for Sealing Lateral Edge Areas of an Endless Conveyor Belt | Jan. 28, 2003 |
| 6,968,941 | Apparatus and Methods for Conveying Objects | Nov. 29, 2005 |
| 2007/0221472 | Systems and Methods for Diverting Objects | Sep. 27, 2007 |
| 7,360,641 | Conveyor Belt Having Rollers That Displace Objects | Apr. 22, 2008 |

BRIEF SUMMARY OF THE INVENTION

The present invention provides a conveyor having a conveyor belt with a plurality of rollers. A magnetic field passing through the conveyor belt interacts with the rollers to rotate the rollers.

In another aspect of the invention, a method for conveying articles comprises: (a) supporting articles atop rollers in a conveyor belt; (b) subjecting the rollers to a magnetic field; (c) rotating the rollers in a direction of rotation with the magnetic field; and (d) propelling one or more articles along the conveyor belt with the rotating rollers.

In yet another aspect of the invention, a conveyor comprises a conveyor belt having a plurality of rollers. Each roller has a rotor and an axis of rotation. Stators positioned to couple magnetic fields to the rotors of the rollers form switched reluctance motors with the rotors. The rollers are controlled by the switched reluctance motors to rotate about their axes of rotation as the rollers encounter the magnetic fields produced by the switched reluctance motors.

In another version, the modular belt of the present invention provides a series of belt modules hingedly interlinked end-to-end to form a conveyor belt. At least one of the modules provides a body section extending from a first end to a second end in a direction of belt travel. Hinge elements are provided along a first end of the body. Hinge elements are also provided along a second end of the body. The hinge elements of two belt modules are interleaved and connected typically with hinge pins. Each of the modules includes a first conveying surface and a second surface, which is typically driven with a sprocket or other rotating member.

At least one cavity is formed in the body section. That cavity communicates with the conveying surface. A roller is rotatably disposed in the cavity to rotate about an axis. A portion of each roller protrudes above the conveying surface so that it can engage articles that are being conveyed on the conveying surface.

In yet another version, at least some of the rollers have a rotor that is ferrous or magnetic. The roller can have an internal ferrous rotor covered or clad with a shell made of, e.g., plastic. Magnetism is used to rotate the rotor as the rotor passes or is located next to a selected locale. This rotation of the one or more rollers enables a package-handling function to be achieved. For example, the rollers can be rotated in order to divert a package from a first conveyor belt to a discharge locale or to a second conveyor belt.

In yet another version, the roller is rotated using a variable reluctance or switched reluctance motor. A permanent magnet or electromagnet will attract a soft magnet material such as iron or steel by virtue of the lines of magnetic flux achieving the path of least resistance. (Resistance to magnetic flux is called reluctance.) This is the fundamental principle by which many electric motors operate. These motors are called variable reluctance motors (VRM's) or switched reluctance motors (SRM's) and consist of a rotor and stator. Motors are described by the number of stator poles and rotor poles.

The stators have electromagnets arranged in a circular pattern, and the rotor is made of a permeable material such as ferrite or silicon steel. There are no wires in the rotor. The shape of the rotor is such that, as it turns, it alternates between regions of dense metal (poles) and regions of air. The electromagnets in the stator turn on and off alternately so that one of the rotor poles is always being attracted to the stator, causing rotation.

Switched reluctance motors are inherently simple and efficient. Any rotary electric motor can have its stator and rotor unwrapped and flattened out. The second embodiment of the present invention employs a linear motor. The stator of a switched reluctance motor is basically unwrapped and laid out linearly to propel a rotor with the proper geometry near a stator. The rotor can be activated by the stator with either an electromagnet (for controlled operation, e.g., computer controlled) or a permanent magnet (for continuous operation). This is the basis for the magnetically actuated roller.

The rotor could be encapsulated in plastic or similar wear-resistant material and mounted in a conveyor belt on an axle or bearing so that it would be free to rotate. The stator would be fixed with respect to the conveyor frame and would consist of an array of either permanent magnets or electromagnets. The force exerted by the stator upon the rotor is proportional to the square of the magnetic flux density in the air gap and the surface area of the pole faces.

The force imparted upon the rotor by the stator is a function of the distance between the stator pole face and the rotor pole face. This distance defines the magnetic circuit air gap. This function is very non-linear, so the force falls off very quickly with increasing air gap length.

The rotor can have rectangular grooves wrapped around a cylinder in a helical fashion or following another curve. The belt that the rotors are mounted in could be composed of an injection moldable ferrite as an example. The ferrite belt reduces the reluctance of the magnetic circuit. Rotors would populate the belt with selective control of any row of rotors.

The direction of rotation of the rollers would be determined by the "handedness" (clockwise or counter-clockwise twist) of the helical rotor grooves. The flux would initially concentrate in the front of the rotor, and the belt motion would result in the location of maximum flux density moving from the front of the rotor through to the back. The number of stator coils (mounted in tandem) and the belt speed would determine the maximum duration of motor operation. The resultant velocity would be the vector sum of the belt velocity and the transverse velocity generated by the rotor.

The rotor could be one of an array of rotors that can be individually powered and controlled as they pass over the C-core electromagnet stator. The coupling would be high, provided that the gap between the belt and stator coil can be made small (e.g., between about 0.025 in and about 0.075 in). The magnetic field intensity can be dynamically adjusted for a variety of loads.

Rotors can be made using a wide variety of helical shapes using different geometries. The rotor could be in the form of a steel strip twisted a half turn. The rotor could be in the form of a loosely coiled steel spring mounted on a plastic rod with four turns. The rotor could be in the form of a rod of steel with three one-quarter turn cuts resulting in three poles. The rotor could be in the form of two steel rods twisted together a half turn with two poles. The variation of reluctance with rotation angle is very high and this results in high torque. The rotor could be in the form of a half turn steel rod roller with four poles. This rotor arrangement presents a large surface area for multiple stator magnets to operate on, resulting in smooth and efficient operation.

In one embodiment, the magnetic field is in the form of a plurality of magnets, each magnet having a width that is preferably about equal to the width of the pole face. Each roller can be a combination of a ferrous or magnetic roller and an outer covering, casing, encapsulation, or cladding of plastic or other non-magnetic material.

The present invention provides a method for conveying articles that employs a conveyor belt driven in a first direction. The conveyor belt includes a section having diverting rollers. The diverting rollers are moved with the conveyor belt to traverse a magnetic field (or a material that is attracted to a magnet if the rollers themselves are made of or comprise magnets—in which case the magnetic field travels with the rollers). The magnetic field rotates the rollers in a selected direction, such as generally transverse to the first direction, namely the direction of conveyor belt travel. (The magnetic field could accelerate, decelerate, or brake the rollers.) The method is completed by diverting one or more objects from the conveyor belt using the diverting rollers. Rotating the diverting rollers can comprise rotating each diverting roller about an axis that forms an angle with the first direction, the direction of belt travel.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
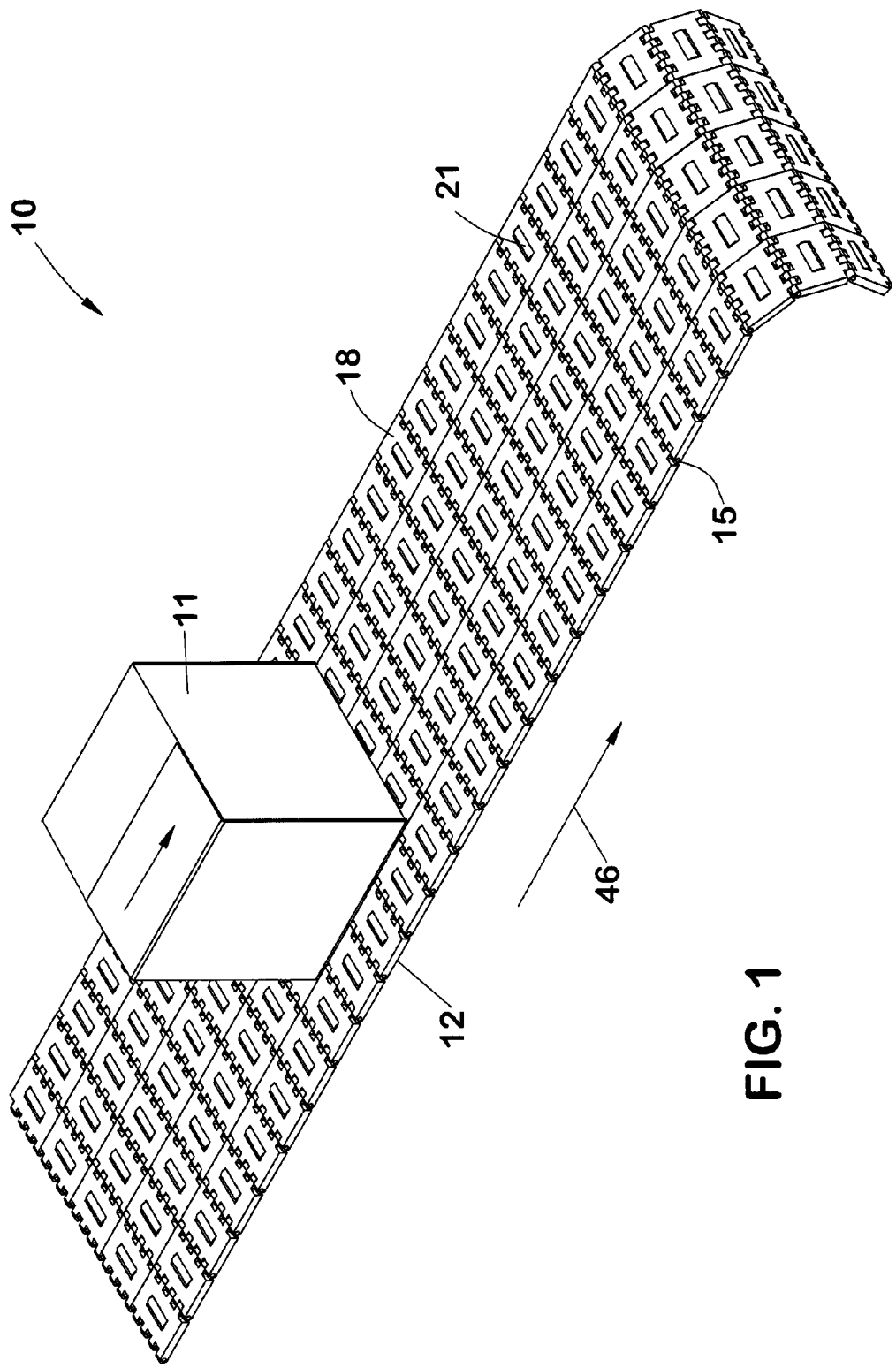
FIG. 1 is a perspective view of an embodiment of the apparatus of the present invention.
Figure 3:
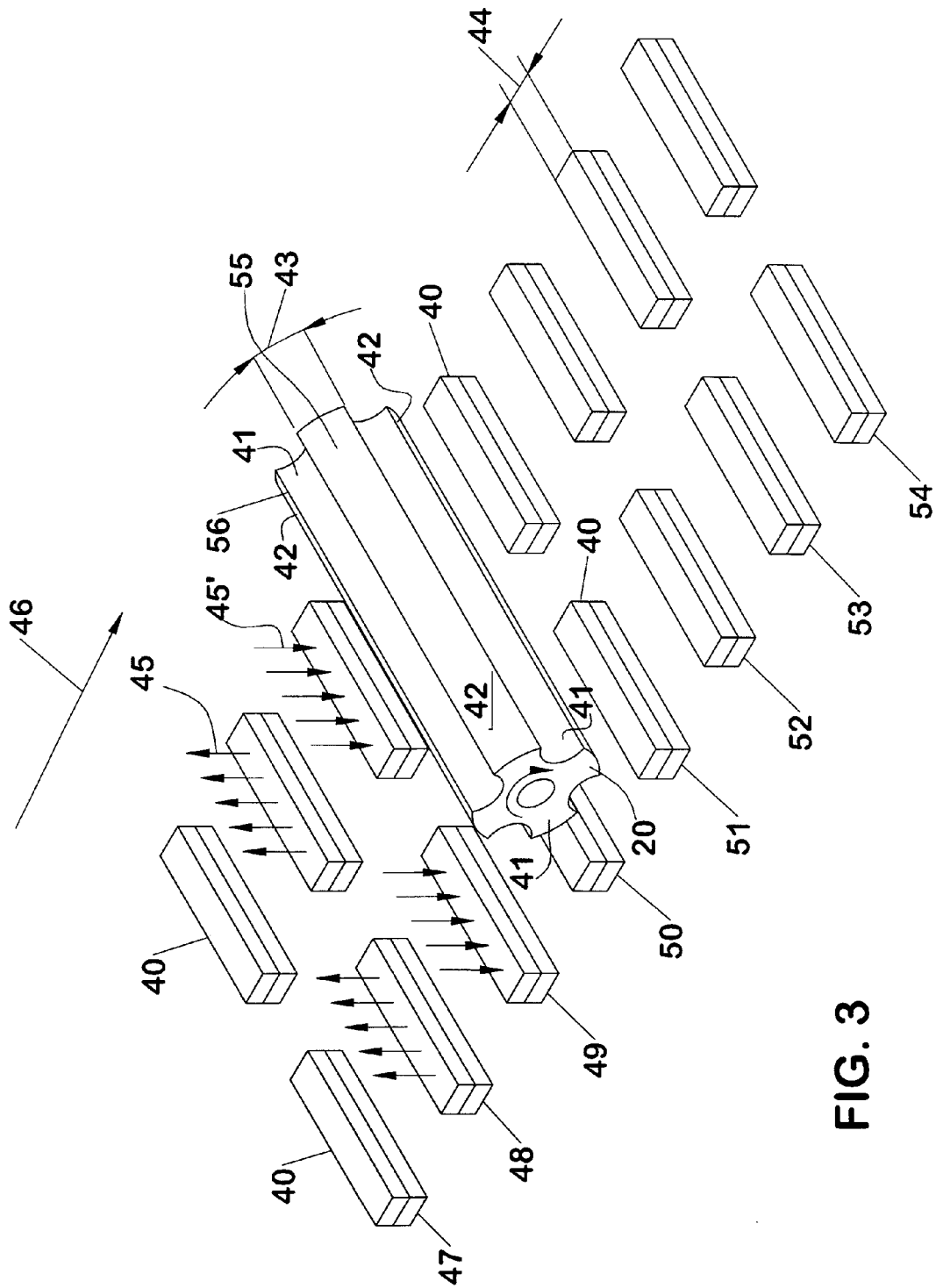
FIG. 3 is a partial perspective view of an embodiment of the apparatus of the present invention.

FIGS. 1 and 3 show an embodiment of the apparatus of the present invention, designated generally by the numeral 10. Conveyor belt apparatus 10 is used to perform a separation or acceleration function on a package or article 11. In FIG. 1, conveyor belt apparatus 10 employs a belt conveyor 12 constructed of a series of rows of one or more belt modules, such as the module 18 in FIG. 15.

Figure 15:
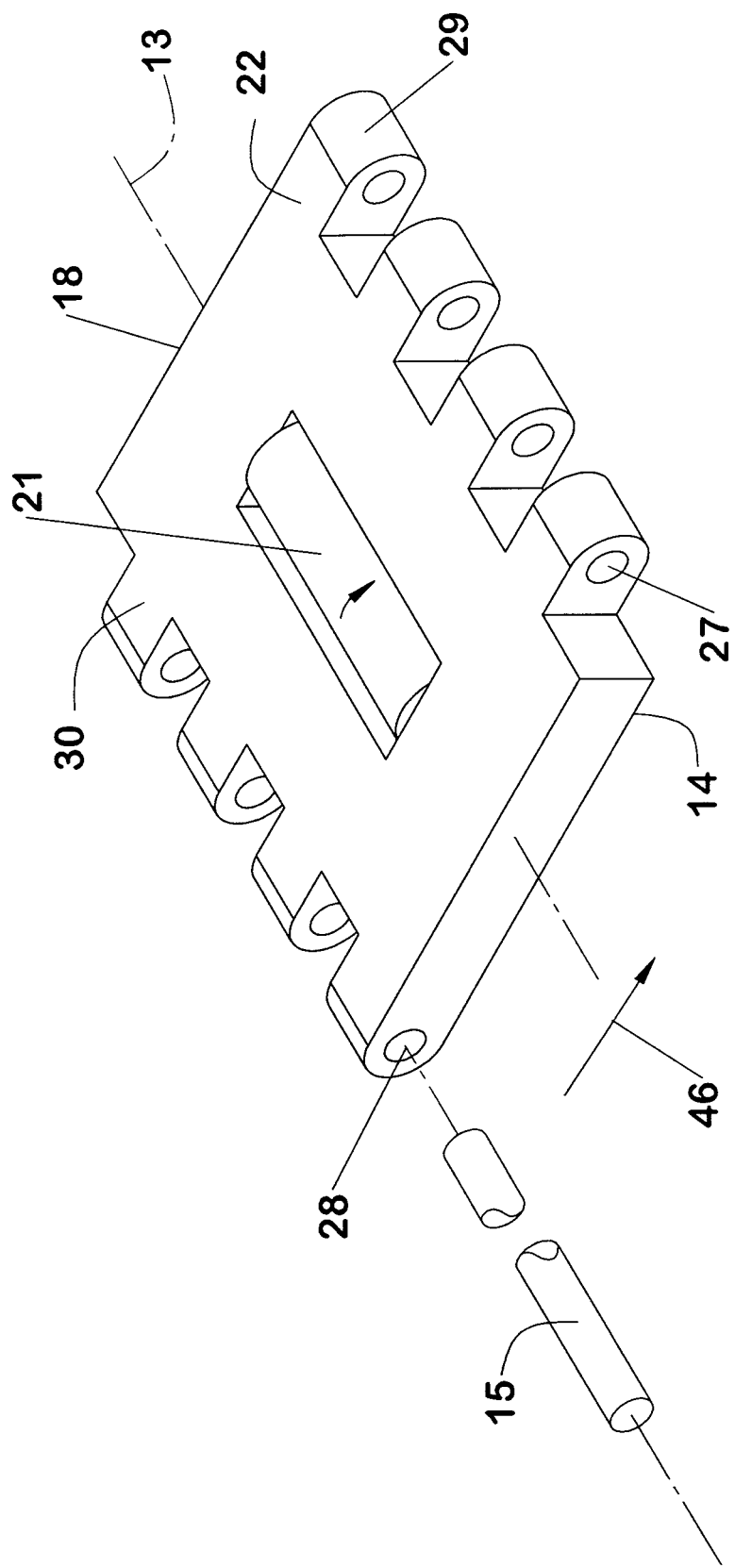
FIG. 15 is a perspective view of an embodiment of the apparatus of the present invention.

Each of the modules 18 provides a plurality of rollers 21. The rollers 21 are in-line belt rollers, meaning that they are arranged to accelerate articles parallel to, or in line with, the direction of belt travel 46. In-line rollers rotate on axes 13 perpendicular to the direction of belt travel. In FIG. 15, each roller 21 extends from a belt cavity to and past an upper surface 22 of the module 18. But the in-line belt roller could reside entirely above the upper belt surface or could extend past an opposite bottom belt surface 14.

Each module 18 has links 29, 30 provided with eyes 27, 28 for connecting to another module. The modules 18 can be identically configured and connectable end to end in one column or side to side and end to end in a series of rows of modules, preferably in a bricklay pattern. Several rows of modules such as the modules 18 are connected end to end to form a conveyor belt 12. In such a case, the links of one row of modules connect to the links of the next row of modules. Pins 15 can be used to connect the links of one row to the links of another row.

In forming the modular conveyor belt 12, the links 29 are joined to the links 30 along the opposite end by hingedly interlinking end to end a pair of modules or rows of modules 18 with other modules to form a conveyor belt 12. For example, the links 29 of module 18 could be hingedly interlinked with the links 30 at the opposite end of an identical module so that openings 27 and 28 are aligned. A hinge pin 15 could then be placed through the aligned eyes or openings 27, 28.

Each in-line belt roller 21 includes a rotor 20. An example of a rotor 20 is seen in FIG. 3 with the outer periphery of the roller removed for illustrative purposes. Each rotor 20 is rotated by a magnetic field emanating from a plurality of magnets, which can be permanent magnets or electromagnets, or from the stator of a variable reluctance motor or a switched reluctance motor.

In FIG. 3, a plurality of magnets 40 is shown in spaced apart positions. The rotor 20 of FIG. 3 is a four-pole rotor, each pole being designated by the numeral 41. Each pole 41 has a pole face 42. The parallel poles extend linearly along the axial direction of the rotor. In one embodiment, the pole face 42 can be of a width 43 that is about equal to the width 44 of a magnet 40. Roller 21 of FIG. 15 has a rotor 20 and an encapsulation, cladding, covering, or coating of a non-metallic material such as plastic.

In operation, the conveyor belt module 18 and other modules are advanced in the direction of belt travel 46. The magnets 40 are positioned under the traveling belt modules 18 containing the in-line rollers 21 with encapsulated rotors 20. As a module 18 traverses the magnetic field (illustrated by up and down arrows 45, 45' in FIG. 3 for two of the magnets), the rotor 20 of each roller 21 falls under the influence of the magnetic field 45, 45' and rotates. The magnets 40 are stationary, positioned under the modules 18. The rollers 21 move with the belt modules 18 in the direction of arrow 46.

As the magnetic field 45 aligns with the rollers 21, the pole face 42 of each pole 41 of rotor 20 aligns with a magnet or magnets 40. In FIG. 3, rows of magnets are designated as rows 47-54. As shown by the opposite directions of arrows 45 and 45', the polarity of the magnets alternates from row to row. In FIG. 3, the rotor 20 has reached a position in which a pole 41 has aligned with a row of magnets designated as row 51.

The magnets 40 in row 51 are attracting a pole 41 of the rotor 20 so that the rotor pole 41 aligns with the magnets 40 of row 51. Continued forward movement of the conveyor belt brings the rotor 20 and its roller 21 to a position that places the rotor pole 41 at position 55 in FIG. 3 to align with the magnets 40 in row 52. Continued forward movement of the conveyor belt brings a rotor pole 41 at position 56 into alignment with the magnets 40 of row 53. Consequently, the in-line belt rollers 21 in the conveyor belt 12 of FIG. 1, under the influence of the magnetic field produced by the magnets underlying the conveyor belt, rotate in the direction of belt travel 46 to propel articles 11 atop the rollers forward along the belt.

Figure 2:
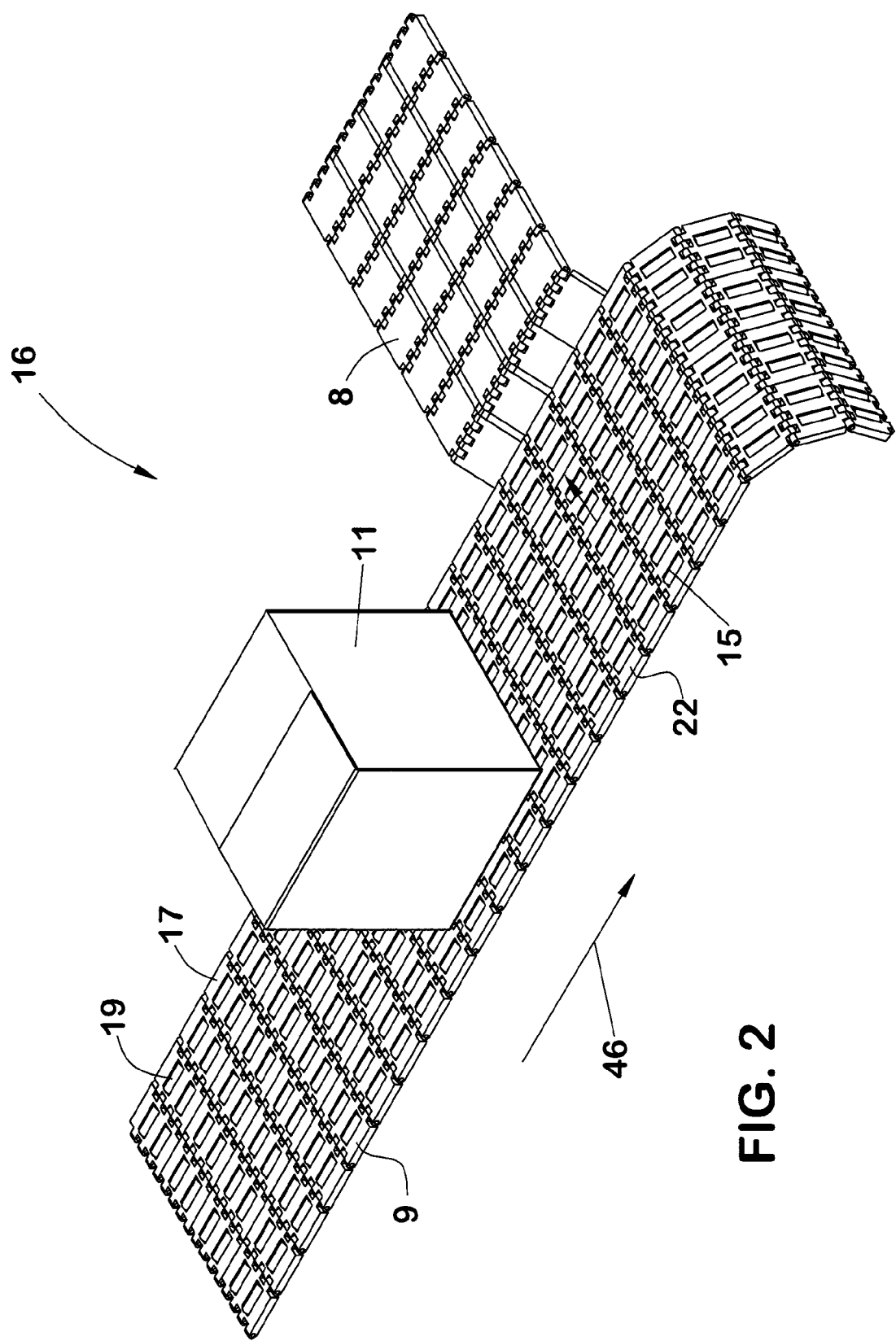
FIG. 2 is a perspective view of another embodiment of the apparatus of the present invention.
Figure 4:
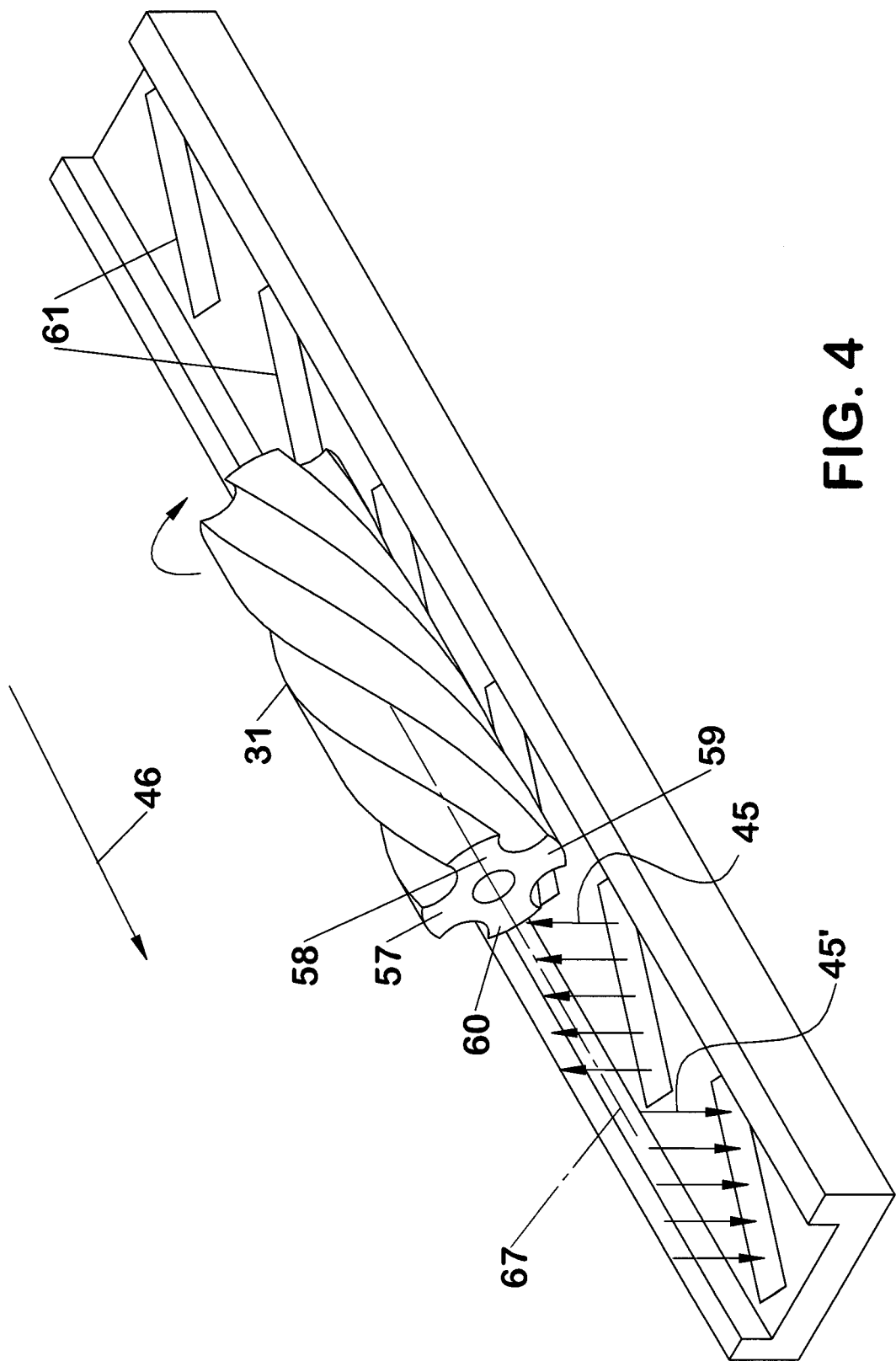
FIG. 4 is a partial perspective view of an embodiment of the apparatus of the present invention.

FIGS. 2 and 4 show another embodiment of the apparatus of the present invention, designated generally by the numeral 16. The conveyor belt apparatus 16 is used to perform a diverting function on a package or article 11. In FIG. 2, the conveyor belt apparatus 16 employs a first belt conveyor 9 and a second conveyor 8 that is arranged to receive articles from the first conveyor 9.

Figure 14:
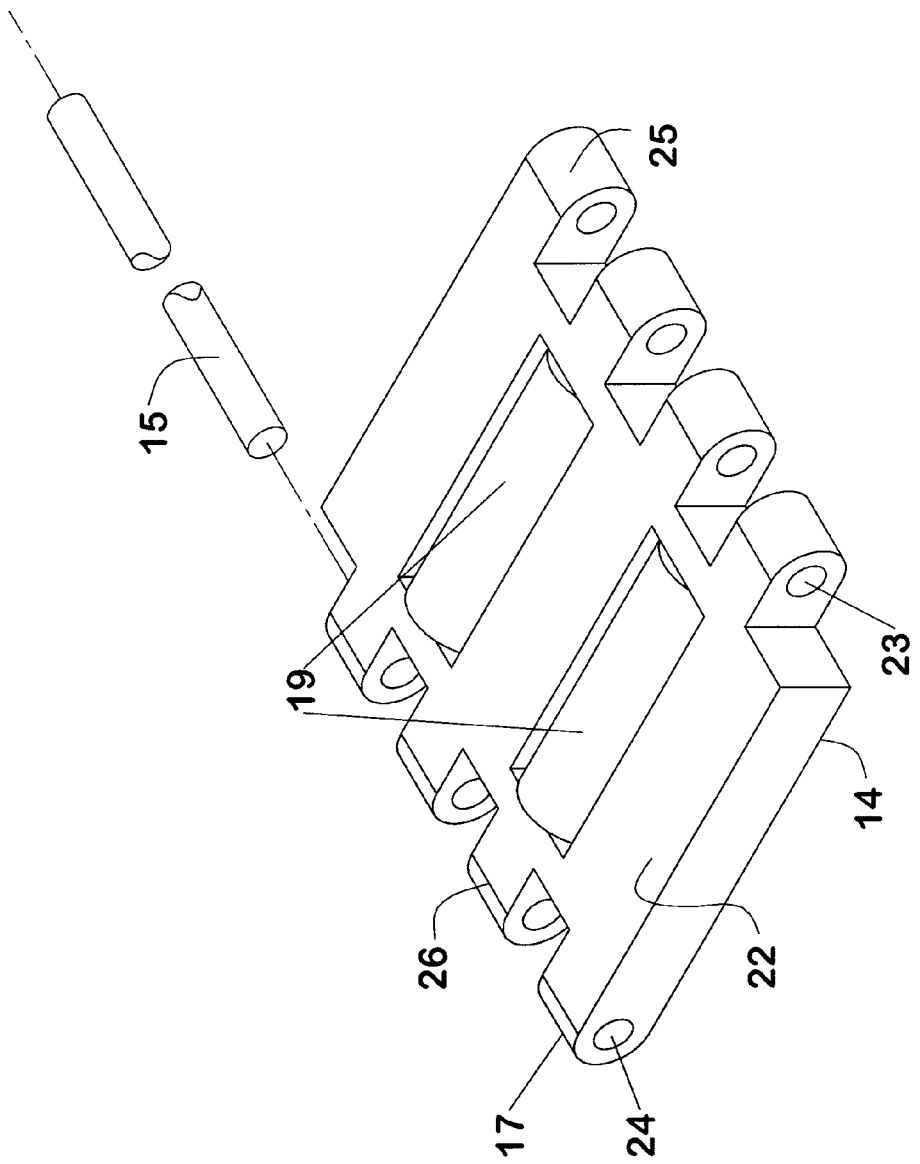
FIG. 14 is an isometric view of an embodiment of the apparatus of the present invention.

The first conveyor 9 comprises a plurality of modules such as the module 17 shown in FIG. 14. Each of the modules 17 provides a plurality of article-supporting rollers 19. The rollers 19 are diverting rollers, meaning that they are arranged to rotate in a direction oblique or perpendicular to a direction of belt travel 46. The diverting rollers give the belt the capability of performing any number of material handling functions, such as product diversion, sortation, singulation, alignment, and orientation. In this example, the diverting rollers 19 are termed transverse rollers because they rotate in a direction transverse (perpendicular) to the direction of belt travel on axes parallel to the direction of belt travel 46. Each transverse diverting roller 19 extends to or through an upper conveying surface 22 of the module 17. In FIG. 14, the diverting roller 19 is shown extending above the upper surface 22 of the module 17 and past a bottom surface 14. Articles supported atop the rotating transverse rollers are pushed laterally across and off the belt onto the outfeed belt 8. The transverse diverting roller 19 need not extend past the bottom surface and could reside entirely above the upper surface.

In forming the first modular conveyor belt 9, links 25 are joined to links 26 along the opposite end by hingedly interlinking end to end a pair of modules or rows of the modules 17 and with other modules to form the conveyor belt 9. For example, the links 25 of the module 17 could be hingedly interlinked with the links 26 at the opposite end of an identical module so that the openings 23 and 24 are aligned. A hinge pin 15 could then be placed through the aligned eyes or openings 23, 24 to link the modules together.

Figure 7:
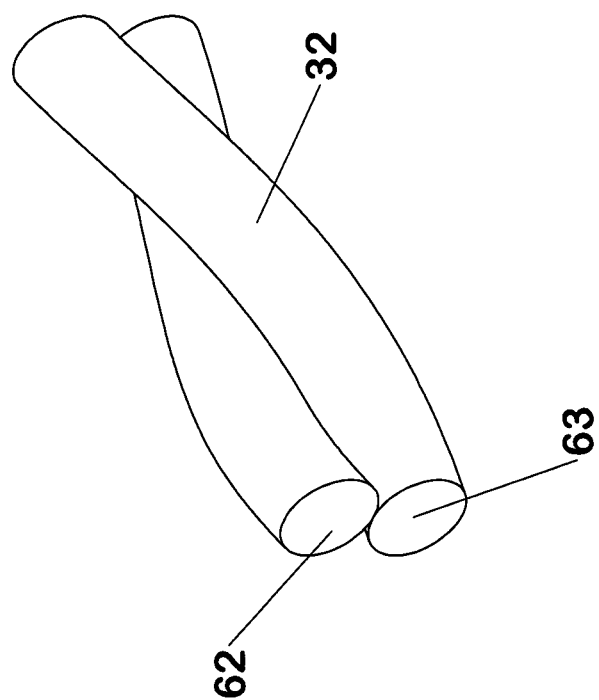
FIG. 7 is a partial perspective view of an embodiment of the apparatus of the present invention illustrating a rotor.
Figure 28:
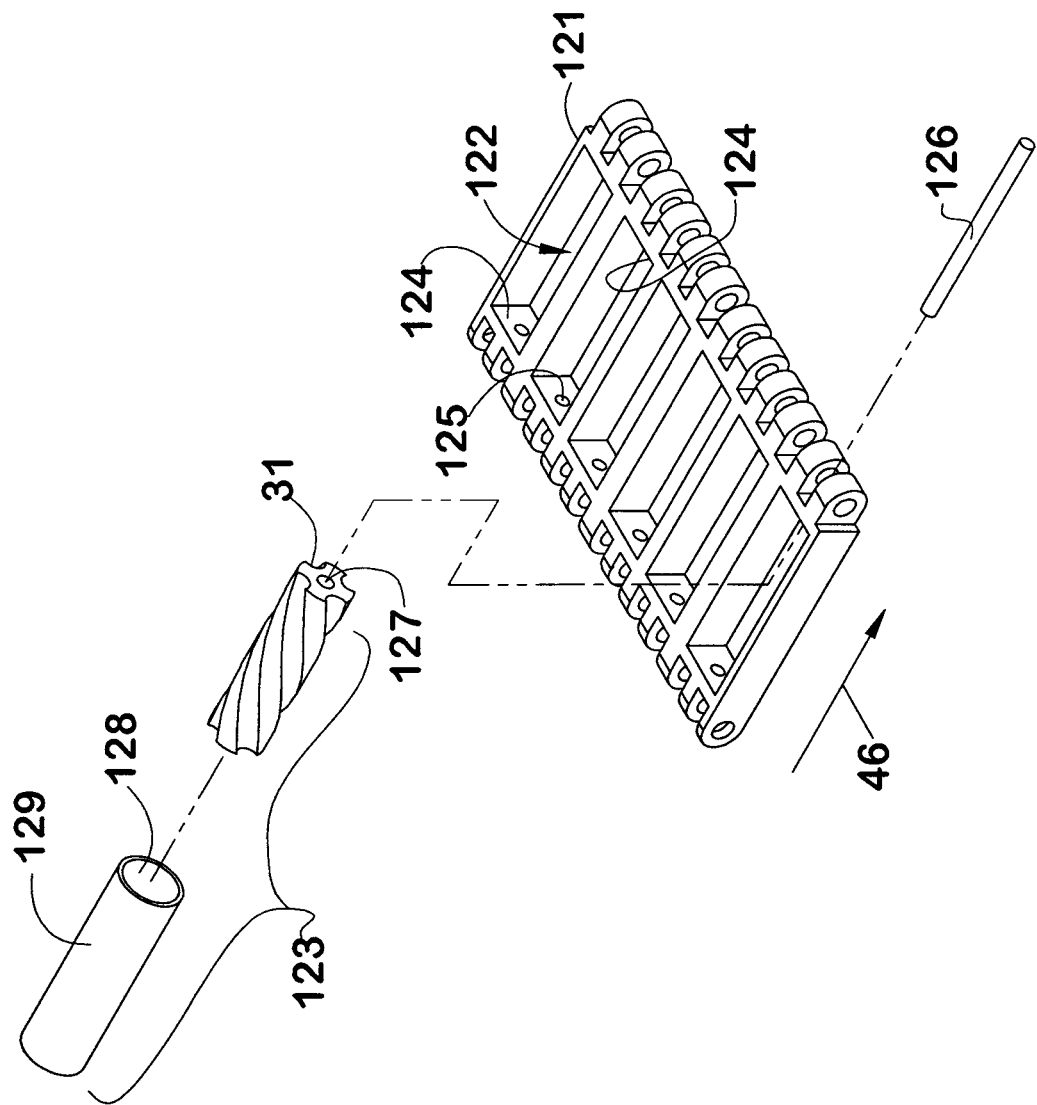
FIG. 28 is an exploded view of an embodiment of the apparatus of the present invention including transverse diverting rollers.

In FIGS. 4, 7, and 28, the rotors 31, 36 each have a spirally placed or helically placed plurality of rotor poles 57-60. The magnets 61 in FIG. 4 are placed at an angle relative to the rotor 31, whose axis 67 is aligned with the direction of belt travel. The magnets 61 of FIG. 4 are angled relative to direction of belt travel 46. As the first conveyor 9 in FIG. 2 advances in the direction of belt travel 46, the magnetic field traversing the conveyor causes the transverse rollers to rotate and push conveyed articles toward the side of the first conveyor and off onto the takeaway conveyor 8. The magnets could be positioned under the conveyor belt by a mechanical actuator, providing means for selectively enabling roller rotation. FIG. 28 shows one construction of a roller 123 in a conveyor belt module 121 having six parallel cavities 122 elongated in the direction of belt travel 46. A transverse diverting roller 123 is received in each cavity. End walls 124 at each end of the cavities have holes 125 to support the ends of roller axles 126, which are loosely received in axial bores 127 in the rotors 31. The rotors are received snugly in bores 128 in cylindrical peripheral shells 129 of the rollers 123. The peripheries of the shells are preferably plastic and coated with a rubber or elastomeric layer if higher frictional contact with conveyed articles is needed. Voids between the rotor and the shell may be filled with a potting compound or fitted with end caps to seal at least the ends of the roller in sanitary applications.

Figure 5:
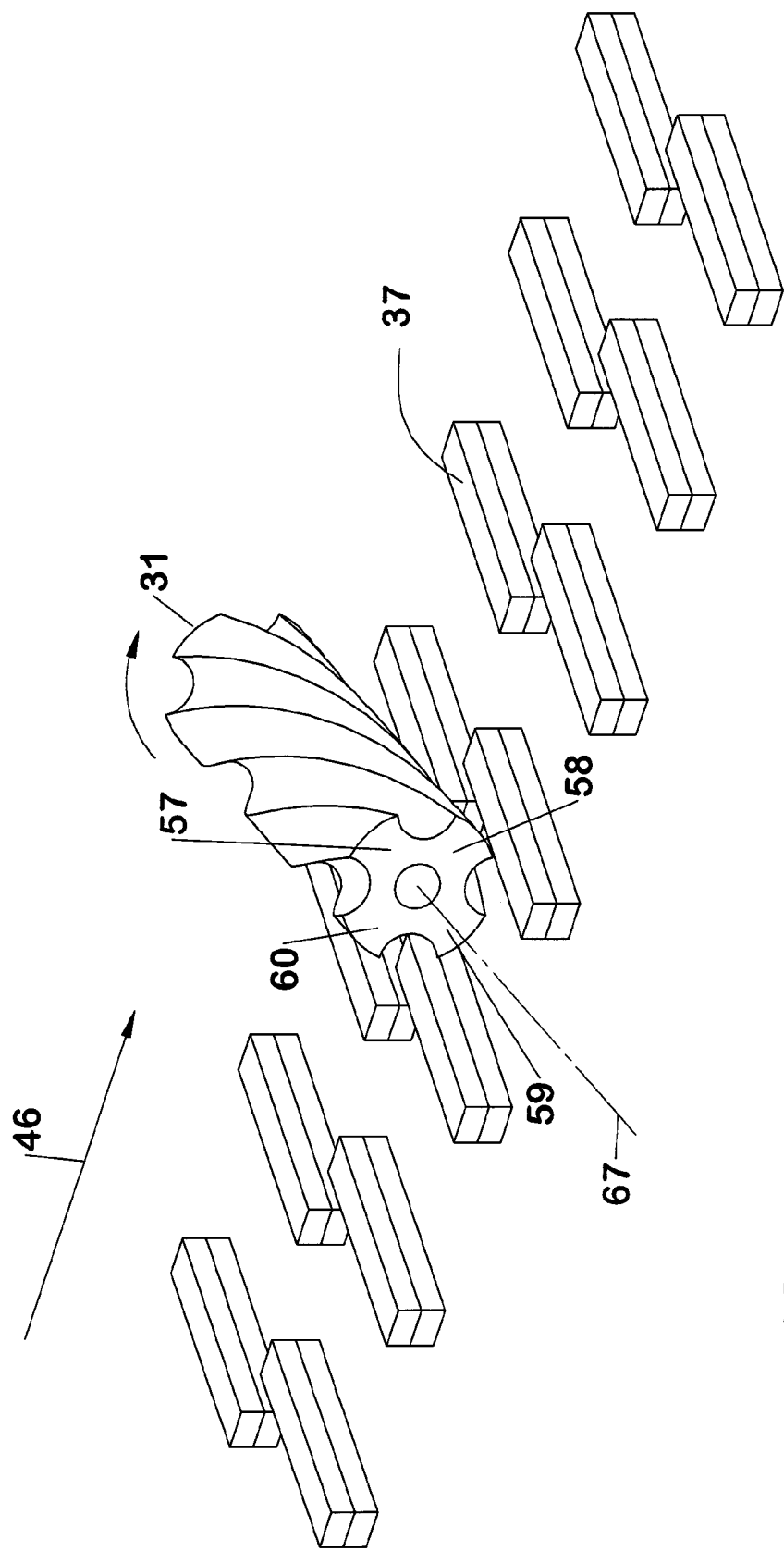
FIG. 5 is a partial perspective view of an embodiment of the apparatus of the present invention illustrating a single angle roller belt.
Figure 6:
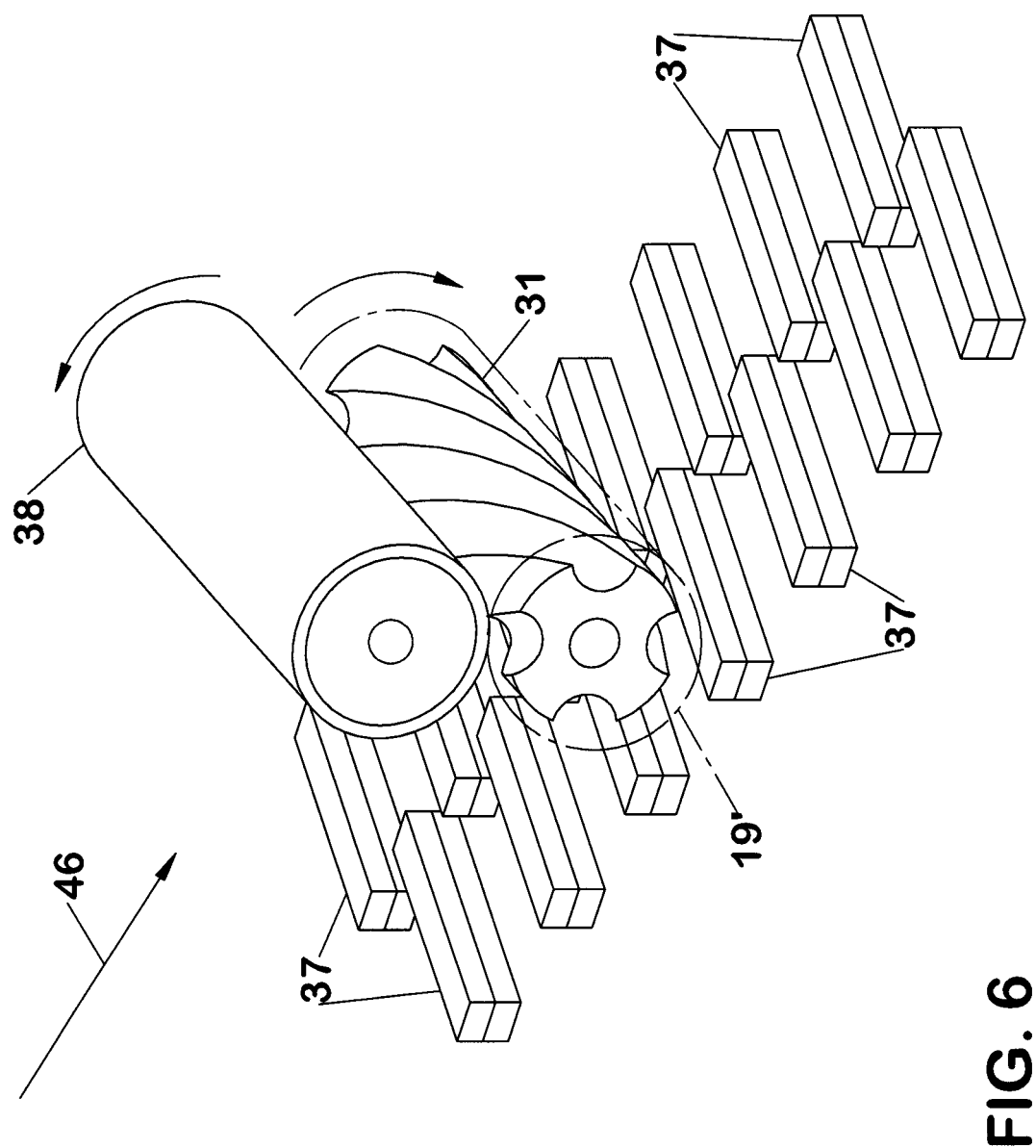
FIG. 6 is a partial perspective view of an embodiment of the apparatus of the present invention illustrating an angled roller roller belt with pairs of upper and lower rollers in contact.

FIG. 5 shows an oblique diverting roller arrangement wherein the roller's rotor 31 rotates about an axis 67 that is oblique to the direction of belt travel 46 to push articles both forward and left or right across the conveyor belt. As the conveyor advances, the rotor rotates under the influence of a plurality of magnets 37 that each form an acute angle with the axis 67. The magnets 37 are also arranged oblique to the direction of belt travel. In FIG. 6, a roller belt arrangement provides an upper roller 38 resting upon a lower roller 19' having the rotor 31. The upper roller 38 does not have a rotor; it rotates responsive to frictional engagement with the lower roller 19'. The upper roller rotates in the opposite direction of the lower roller 19' and can propel articles with a component of motion opposite to the direction of belt travel 46. In this example, the lower roller 19' does not have to extend past the belt's conveying surface as long as it can contact the upper roller.

In FIGS. 7-11 and 27, other configurations for a rotor that is part of an in-line 21 or diverting roller 19 are shown. In the rotor 36 of FIG. 7, the spiral poles can be wound clockwise instead of counterclockwise as in rotor 31. This arrangement causes the rotor 36 to rotate in a different rotational direction from the rotational direction of the rotor 31.

Figure 27B:
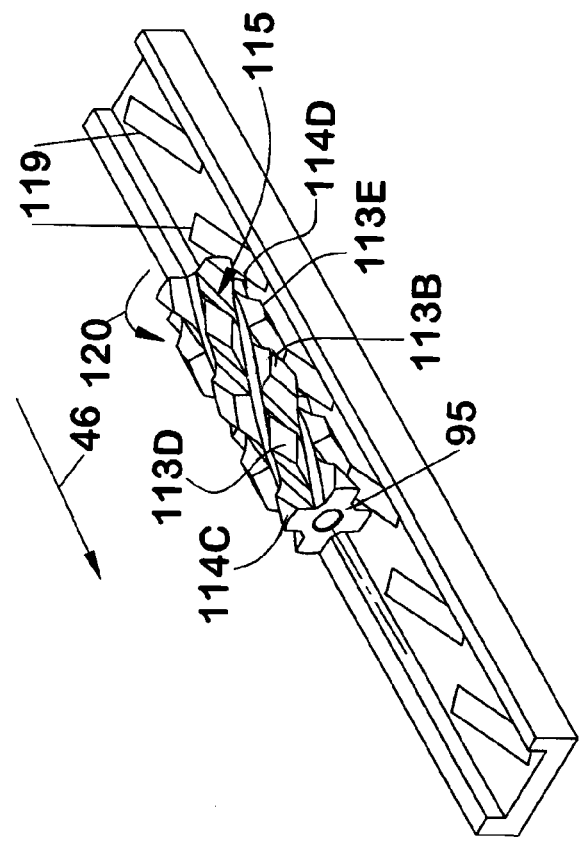
FIGS. 27A and 27B are partial perspective views of an embodiment of the apparatus of the present invention including a bidirectional rotor.
Figure 27A:
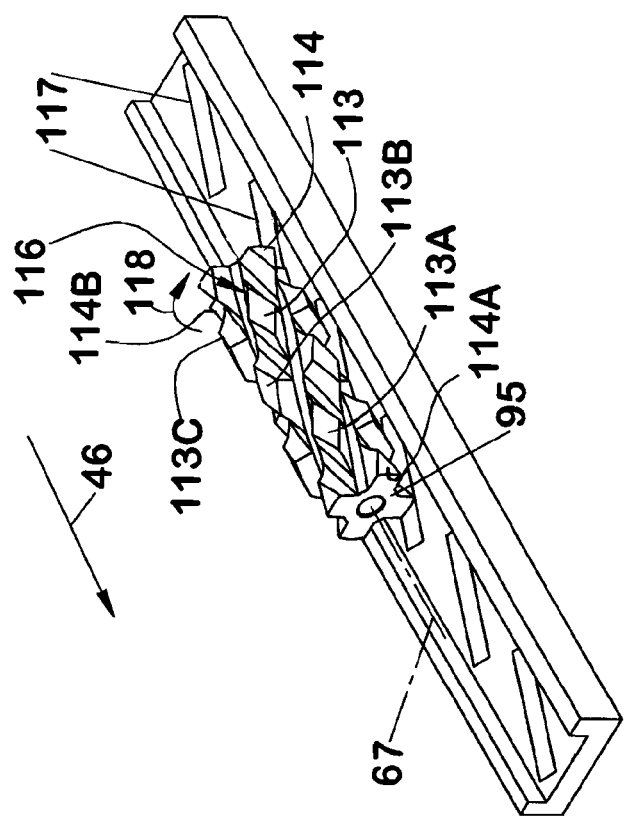

FIGS. 27A and 27B show a bidirectional rotor 95 that is a combination of the clockwise spiral poles in the rotor 36 of FIG. 7 and the counterclockwise spiral poles in the rotor 31 of FIG. 4. The result is a plurality of diamond-shaped pole faces 113 and half-diamond-shaped pole faces 114 separated by intersecting clockwise and counterclockwise grooves 115, 116. For example, pole faces 114A, 113A, 113B, 113C, and 114B in FIG. 27A form a single segmented counterclockwise pole like one of the continuous counterclockwise poles of FIG. 4. And pole faces 114C, 113D, 113B, 113E, and 114D in FIG. 27B form a single segmented clockwise pole like one of the continuous clockwise poles in the rotor of FIG. 7. With underlying magnets 117 oriented as in FIG. 27A, the rotor rotates clockwise 118 by the interaction of the segmented counterclockwise poles with the magnetic field produced by the angled magnets as the conveyor belt advances in the direction of arrow 46. With underlying magnets 119 oriented as in FIG. 27B, the rotor rotates counterclockwise 120 by the interaction of the segmented clockwise poles with the magnetic field produced by the angled magnets as the conveyor belt advances in the direction of arrow 46. The direction of rotor rotation can also be reversed in each figure by advancing the conveyor belt in the direction opposite to arrow 46. Thus, conveyor belts with rollers having these bidirectional rotors can be used to divert articles to either side by appropriate arrangement of the underlying magnets. The angle and position of the underlying magnets may be fixed or could be mechanically oriented, providing an enabling means of control of the rotating direction and thereby the package 11 direction of motion.

Figure 8:
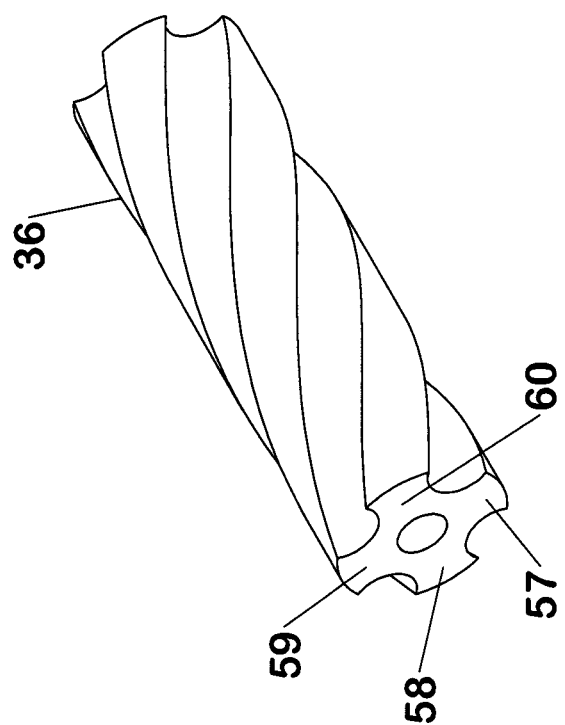
FIG. 8 is a partial perspective view of an embodiment of the apparatus of the present invention illustrating a rotor.
Figure 10:
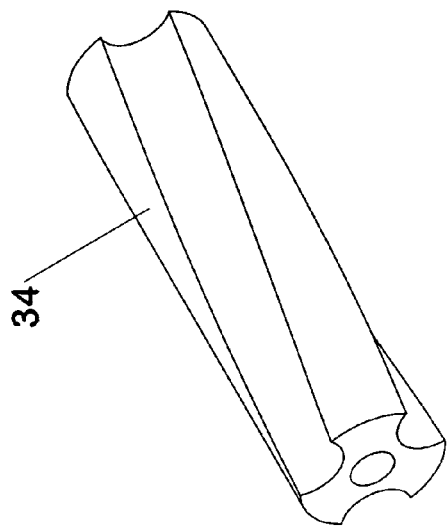
FIG. 10 is a partial perspective view of an embodiment of the apparatus of the present invention illustrating a rotor.
Figure 11:
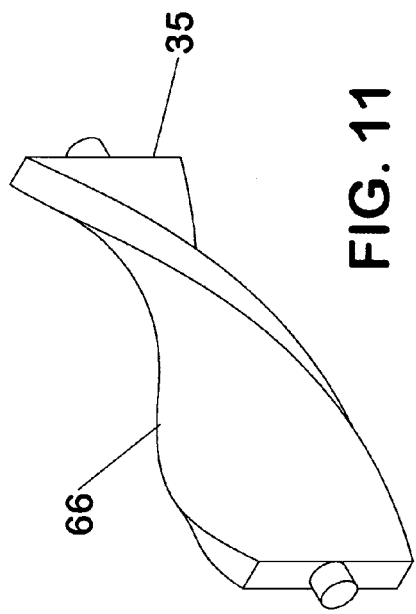
FIG. 11 is a partial perspective view of an embodiment of the apparatus of the present invention illustrating a rotor.
Figure 9:
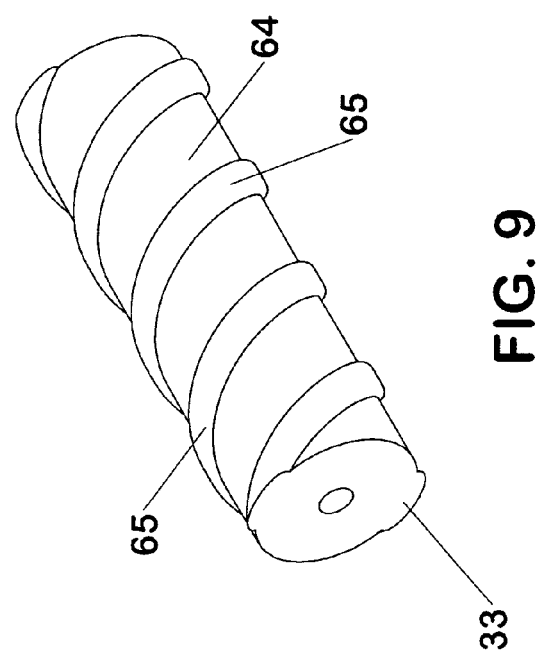
FIG. 9 is a partial perspective view of an embodiment of the apparatus of the present invention illustrating a rotor.

In FIG. 8, the rotor 32 has a pair of helically wound members 62, 63. In FIG. 9, the rotor 33 is a cylinder 64 having a helically formed magnetic band 65 thereon. In FIG. 10, the rotor 34 has three poles instead of the four shown in FIG. 4. In FIG. 11, the rotor 35 is in the form of a helically shaped plate 66.

Figure 12:
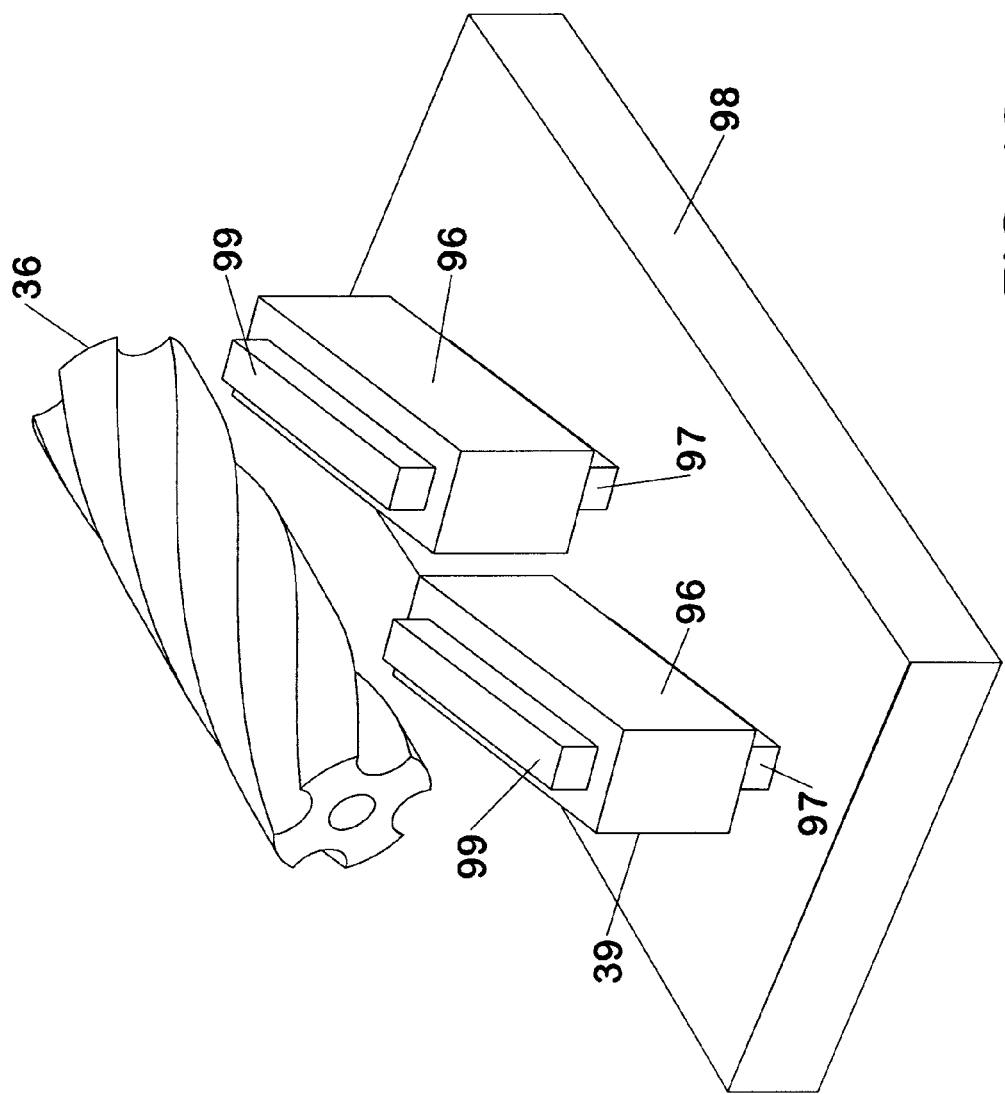
FIG. 12 is a perspective view of a portion of an embodiment of the apparatus of the present invention.
Figure 13:
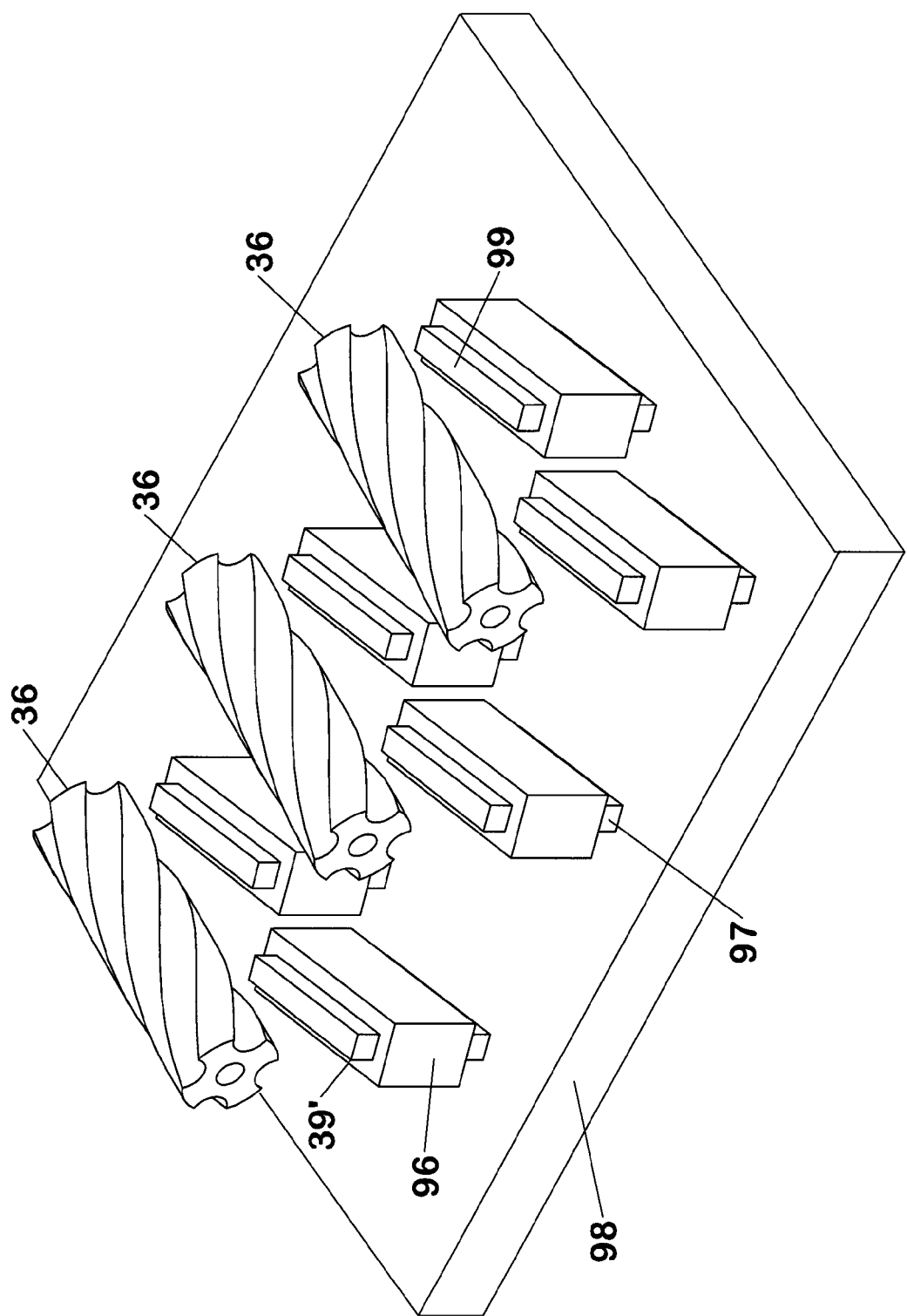
FIG. 13 is an expanded perspective view of the embodiment of FIG. 12.

FIGS. 12 and 13 show portions of a diverting-roller arrangement like FIG. 5, except with electromagnets 39, 39' mounted on a base 98 in place of permanent magnets. Each electromagnet includes an iron core 97 around which a coil 96 is wound. Pole faces 99 of the electromagnets are positioned like the pole faces of the permanent magnets in FIG. 5 to produce magnetic fields that causes the rotors 36 of the belt rollers to rotate as the belt advances past the electromagnets. The magnetic fields produced by the magnets may be selectively energized and de-energized as required.

Figure 16:
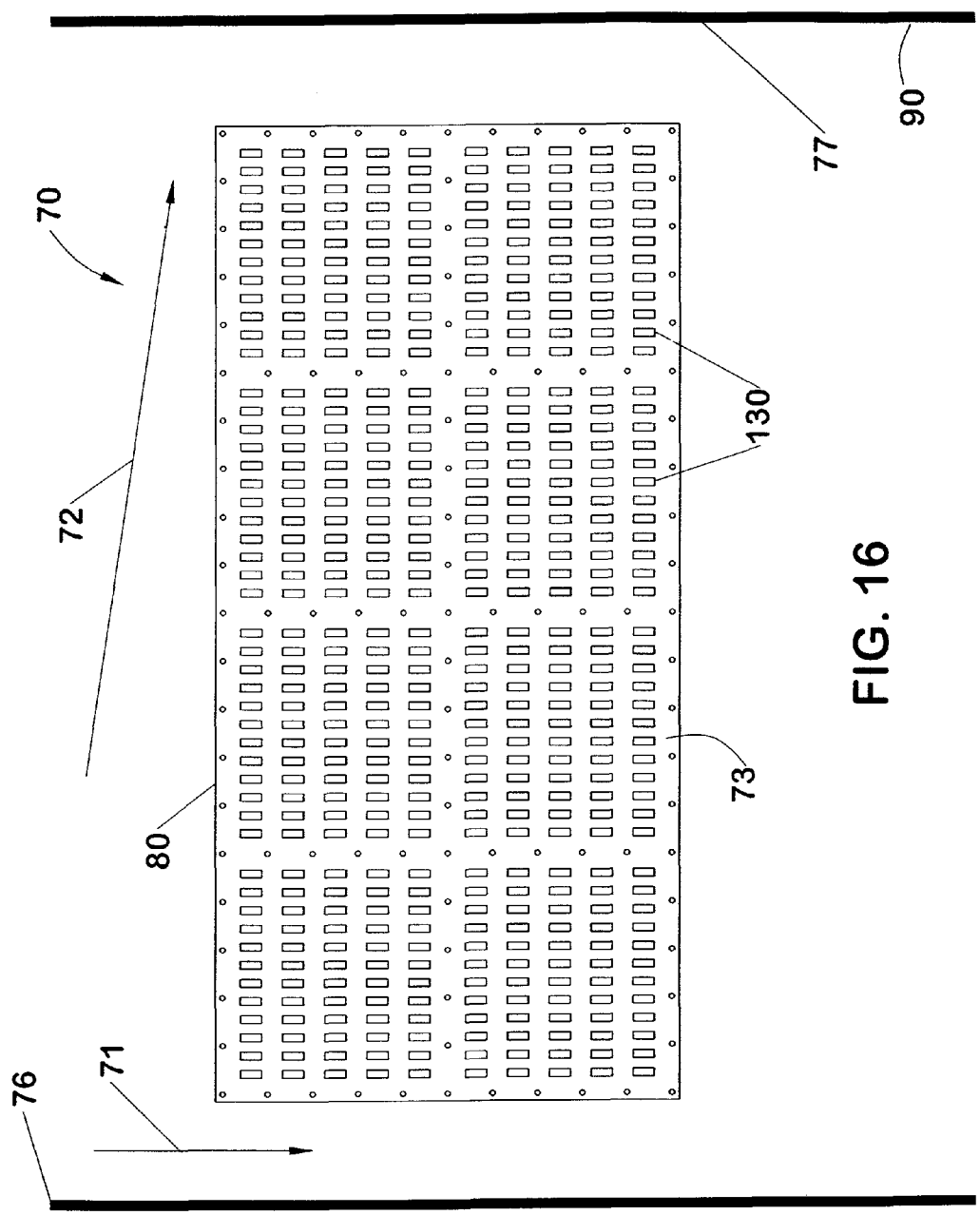
FIG. 16 is a schematic plan view of the alternate embodiment of the apparatus of the present invention.
Figure 17:
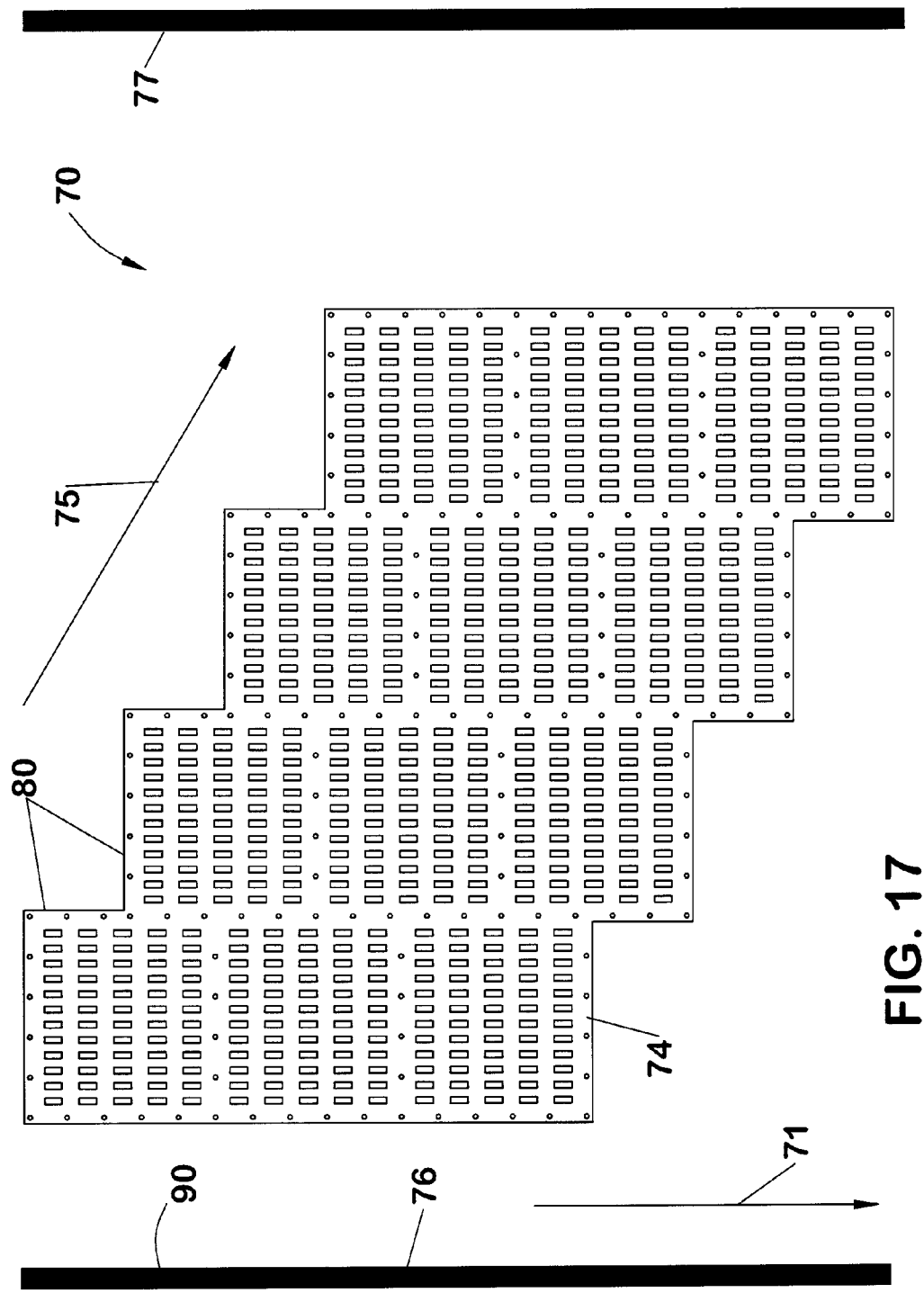
FIG. 17 is a schematic plan view of the alternate embodiment of the apparatus of the present invention.

FIGS. 16-26 show an alternate embodiment of the apparatus of the present invention, designated generally by the numeral 70 in FIGS. 16-17. A plurality of base plates 80 support and form part of stators underlying a conveyor belt. FIGS. 16 and 17 show exemplary stator layouts. In FIG. 16, a layout 73 provides stator positions at openings 130 laid out for a package 11 with a high resultant trajectory angle or for a generally straight side-to-side motion as indicated schematically by the arrow 72 in FIG. 16 when used with a transverse roller belt as in FIG. 2. In FIG. 17, a staggered stator layout 74 is shown that could be used for lower trajectory angles. In FIG. 17, the arrow 75 schematically illustrates the direction of package 11 motion. In FIGS. 16 and 17, the arrow 71 schematically illustrates the direction of conveyor motion.

Figure 18:
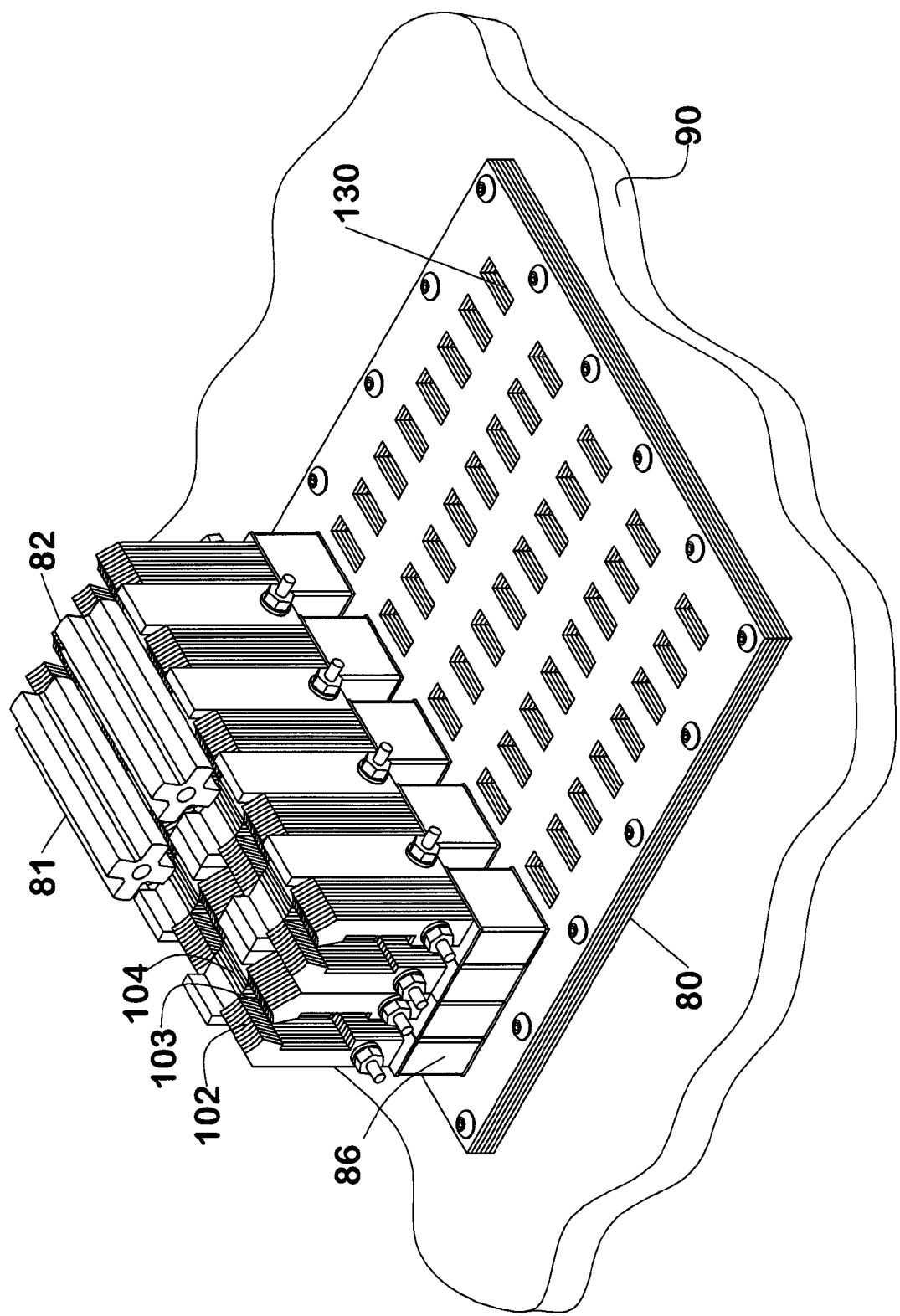
FIG. 18 is a partial perspective view of the alternate embodiment of the apparatus of the present invention.
Figure 19:
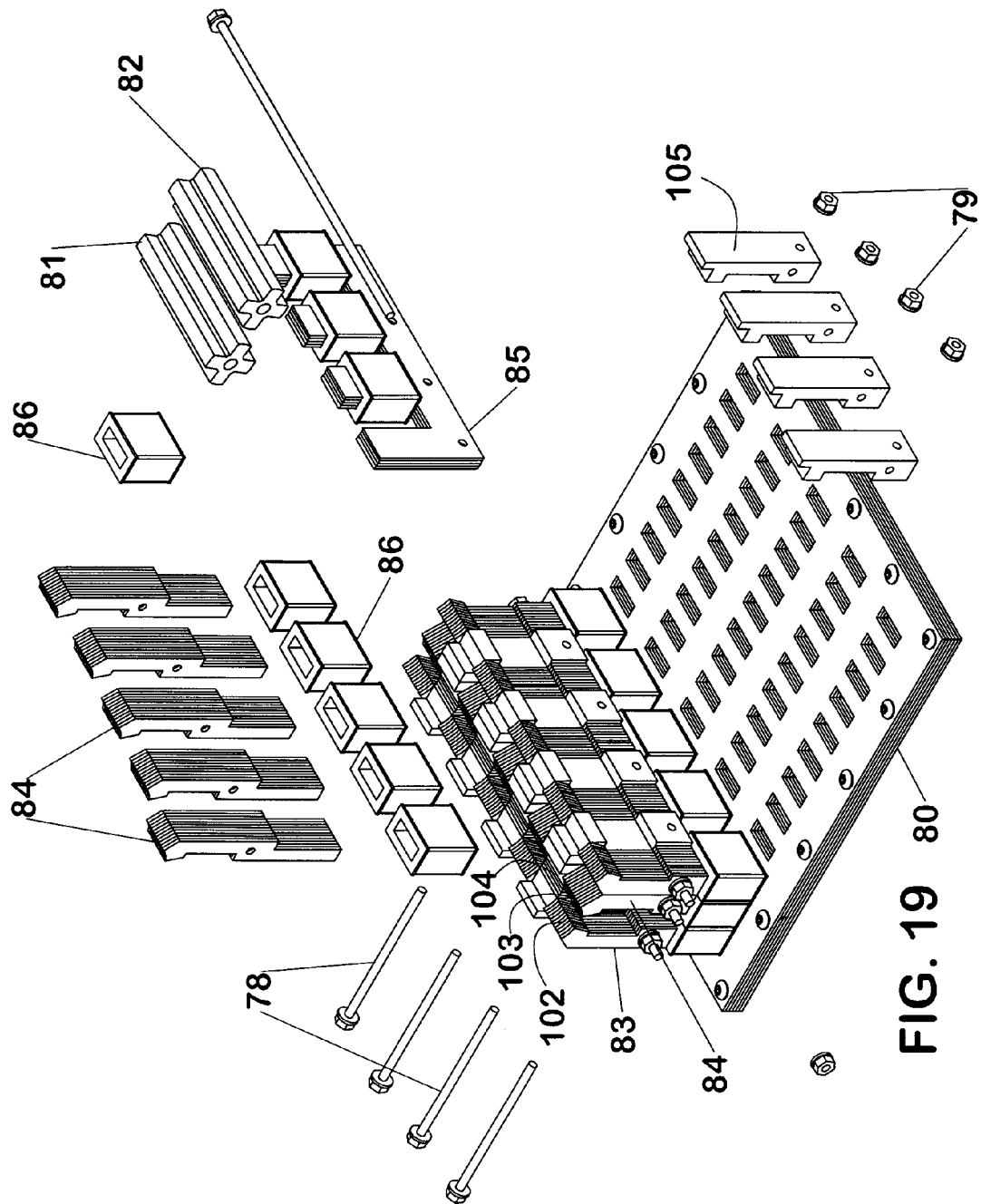
FIG. 19 is an exploded perspective view of the alternate embodiment of the apparatus of the present invention.

The conveyor of FIGS. 16 and 17 provides a conveyor frame 90 having edge portions 76, 77. Each stator base plate 80 can be provided with the stators of switched reluctance motors. In FIGS. 18 and 19, two rotors of two transverse diverting rollers and two stators are shown as an example of a switched reluctance motor formed by the stators and rotors. The plate 80 could be populated with stators to control multiple rollers such as, for example, up to six rollers. The base plate 80 attaches to conveyor frame 90 and provides mechanical support for stator cores 83, 84, 85, which terminate in upward-facing pole faces 102, 103, 104. The base plate 80 can be constructed of laminated, magnetically soft (ferrous) material to provide a return path for the magnetic flux.

In FIGS. 18 and 19, there can be three laminated stator cores located below each roller. The stator construction could be modular so that any number of rollers could be actuated over any desired length of the conveyor 70. Two of the three stator cores mount into the base plate 80 as seen in FIG. 18. The other core 85, which is shown in FIG. 19 with four pole faces that are received in the openings 130, is sandwiched between the outer stator poles 83, 84 with the pole faces centered below and offset in the axial direction of the rotors 81, 82. Coils 86 can be wound on a nylon bobbin with a bore that receives the core. The entire assembly of base plate 80 and cores 83, 84, 85 can be bolted together using nylon fasteners 78, nuts 79 and retainers 105 that are used to obtain the proper mechanical registration.

Figure 20:
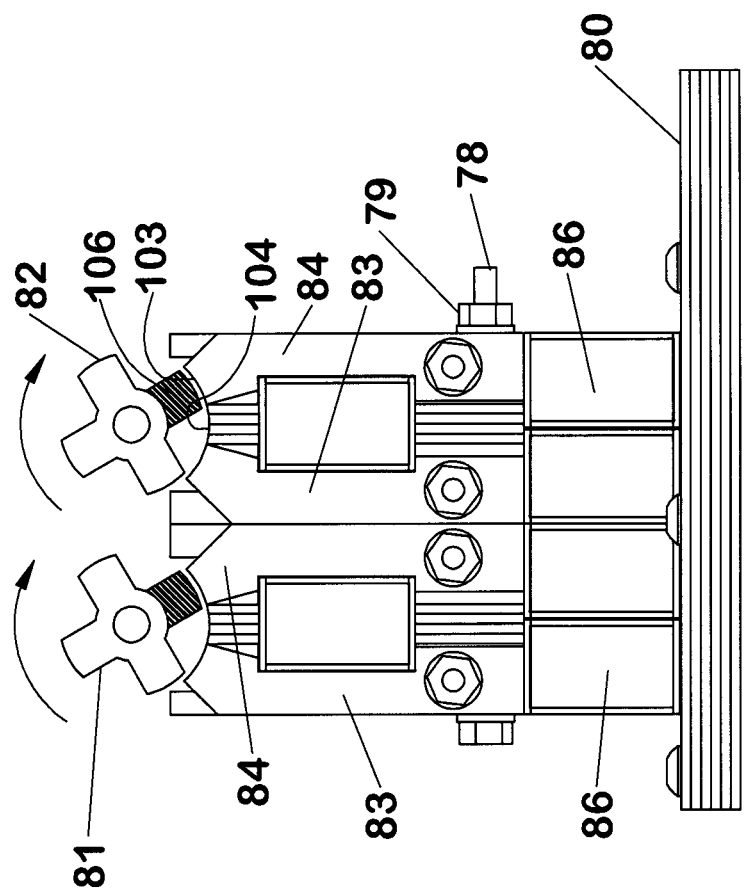
FIG. 20 is a schematic end view of the preferred embodiment of the apparatus of the present invention.
Figure 21:
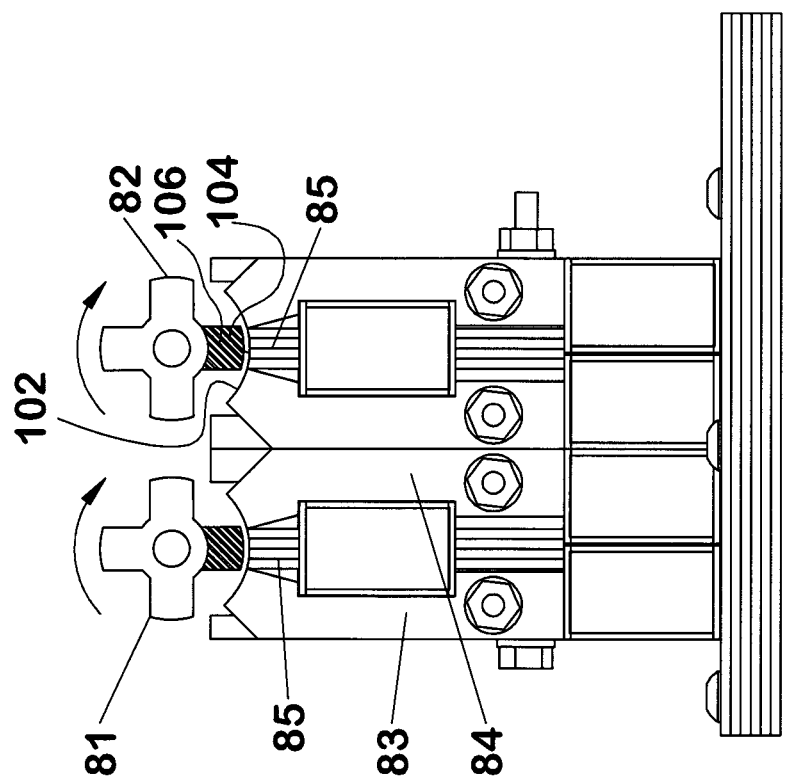
FIG. 21 is a schematic end view of the preferred embodiment of the apparatus of the present invention.
Figure 22:
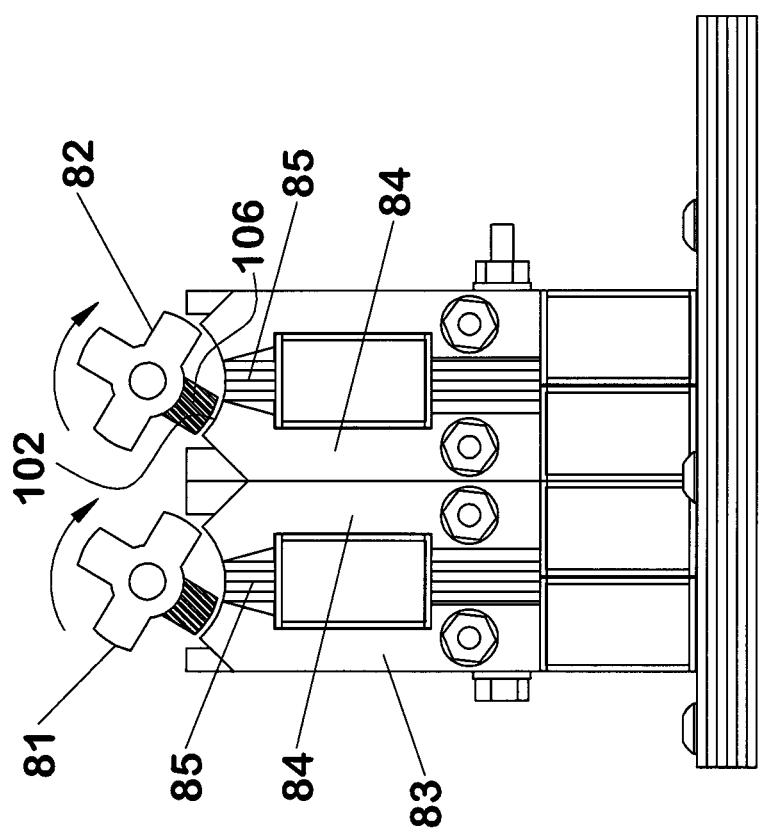
FIG. 22 is a schematic end view of the preferred embodiment of the apparatus of the present invention.

Depicted in FIG. 20 is a front view of the conveyor belt 70 with the rotors 81, 82 at a rotation angle of −30° relative to vertical. In FIG. 20 each right hand stator pole face 103 is aligned with a pole 106 of each rotor 81, 82. The right hand pole face pull would be deactivated by stator control circuitry. The center stator pole face 104 would be energized and would attract the rotor pole 106 to a 0° position relative to vertical as shown in FIG. 21. The left hand stator pole face 102 would then be energized and the result would be a +30° rotor angle as shown in FIG. 22. The above sequence would be repeated, resulting in a continuous clockwise roller 81, 82 rotation with twelve energization pulses per revolution for the four-pole rotor. And the rollers can be rotated regardless of whether the conveyor belt is moving or stationary. The order of the sequence could be reversed to achieve counterclockwise rotation of a roller 81, 82. The magnetic circuit for this arrangement is such that the field lines act axially along the rotor 81, 82 through one rotor pole and two stator pole faces. There are always two stator pole faces of each phase below the rotor regardless of belt location.

Figure 23:
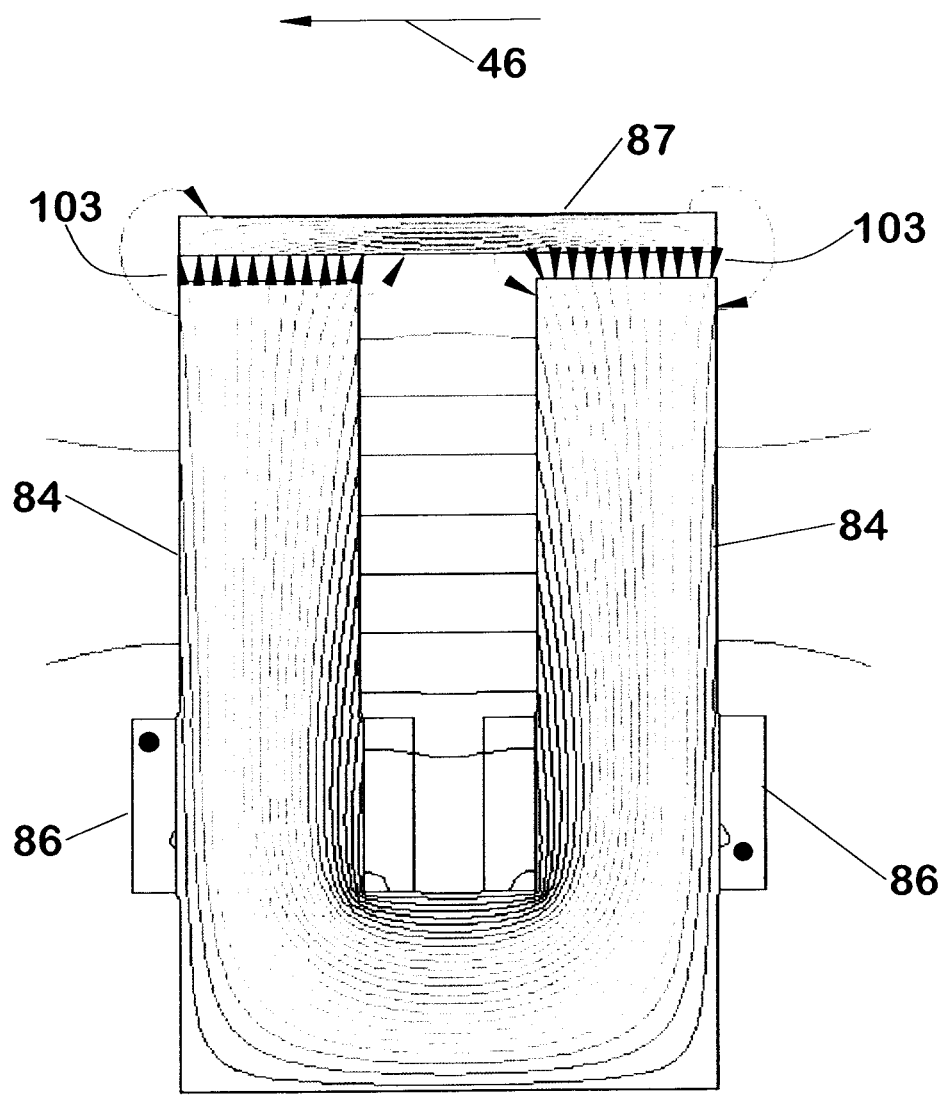
FIG. 23 is a schematic diagram of the alternate embodiment of the apparatus of the present invention showing a magnetic analysis.

FIG. 23 shows a magnetic analysis of the magnetic circuit of the switched reluctance roller arrangement of the present invention. The path for most switched reluctance motors acts in a radial direction through two rotor poles. The path for the switched reluctance roller arrangement of the present invention acts in a longitudinal direction through one rotor pole. The magnetic flux circulates from one stator pole, through the rotor to an adjacent stator pole, and then returns through the base plate 80. An FEA (finite element analysis) plot of the magnetic circuit is shown in FIG. 23. The bar 87 at the top of the plot is the rotor pole aligned axially in the direction of belt travel 46. The rest of the magnetic circuit forms a U shape, in which the two vertical legs of the U represent two consecutive right hand (or left hand or center) stator cores 84 and the base of the U represents the base plate 80. The two pairs of open rectangles are the stator coils 86, each wound or energized to produce opposite poles at each pole face 103.

Figure 24:
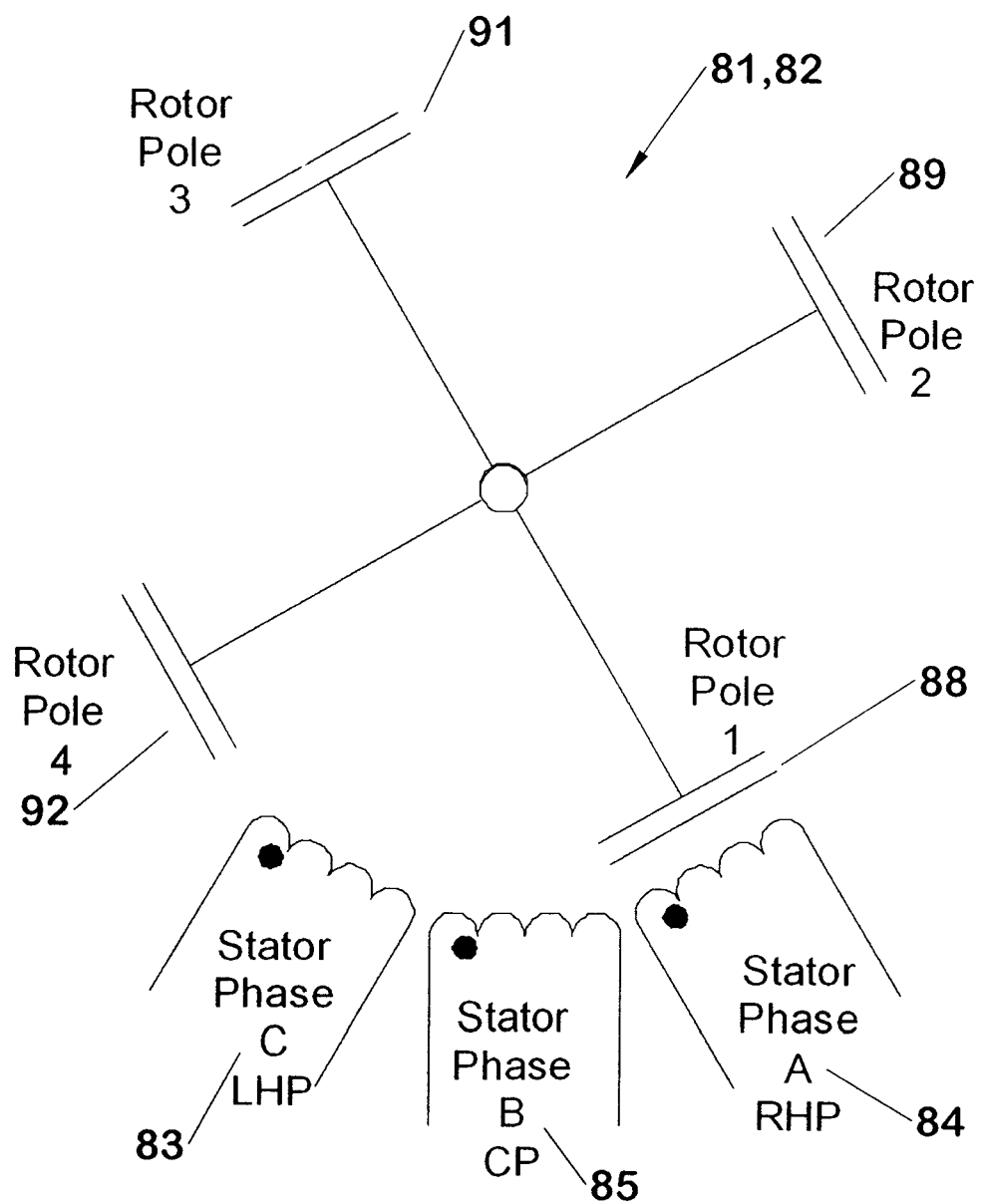
FIG. 24 is a schematic diagram of the alternate embodiment of the apparatus of the present invention.
Figure 25:
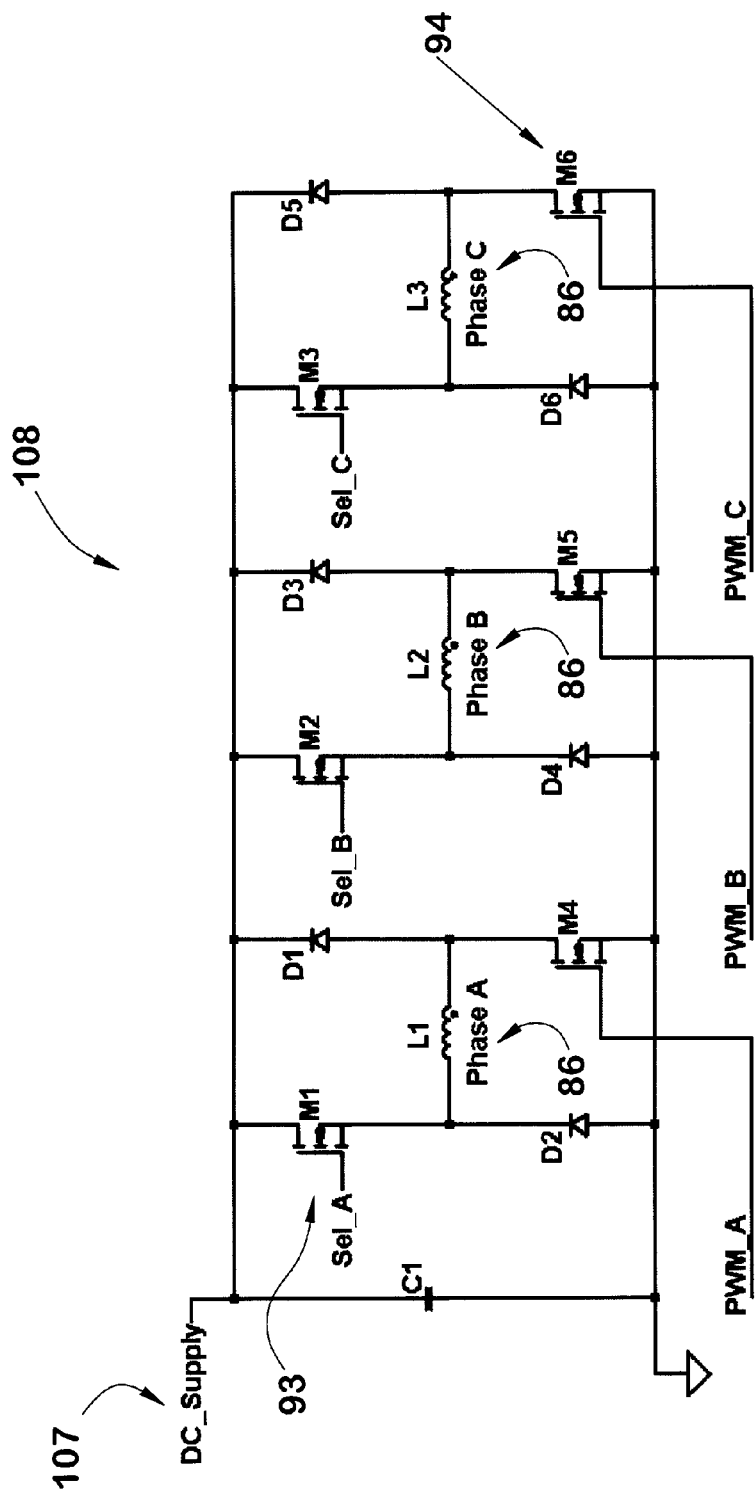
FIG. 25 is a circuit diagram of the alternate embodiment of the apparatus of the present invention.

A schematic diagram of the switched reluctance roller arrangement of the present invention is shown in FIG. 24. Individual coils are energized by drive electronics such as depicted in FIG. 25. The coils 86 on each stator core 84, 85, 83 are sequentially operated in A-B-C order and attract the rotor poles 88, 89, 91, 92 for clockwise rotation. The sequence is A-C-B and 88-92-91-89 for counterclockwise rotation.

The stator coil drive circuit 108 of FIG. 25 can comprise two independent switches for each phase. High side switching 93 (M1, M2 and M3) powers the phase winding from a dc power supply 107 supplying a dc voltage (DC_Supply), while the low side switching 94 (M4, M5, M6) to ground is pulsed for motor speed control with PWM (pulse-width-modulated) signals (PWM_A, PWM_B, PWM_C). The diodes (D1-D6) catch the flyback voltage from the phase winding when a stator coil 86 (L1, L2, L3) is de-energized. The drive electronics would detect rotor 81, 82 position based on generated flux, which is proportional to the drive current. This could all operate under a microprocessor control, such as that shown in FIG. 26. One processor 110 might control a single roller 81, 82 position, a row of rollers, or an entire array of rollers, depending on the motion requirements.

Figure 26:
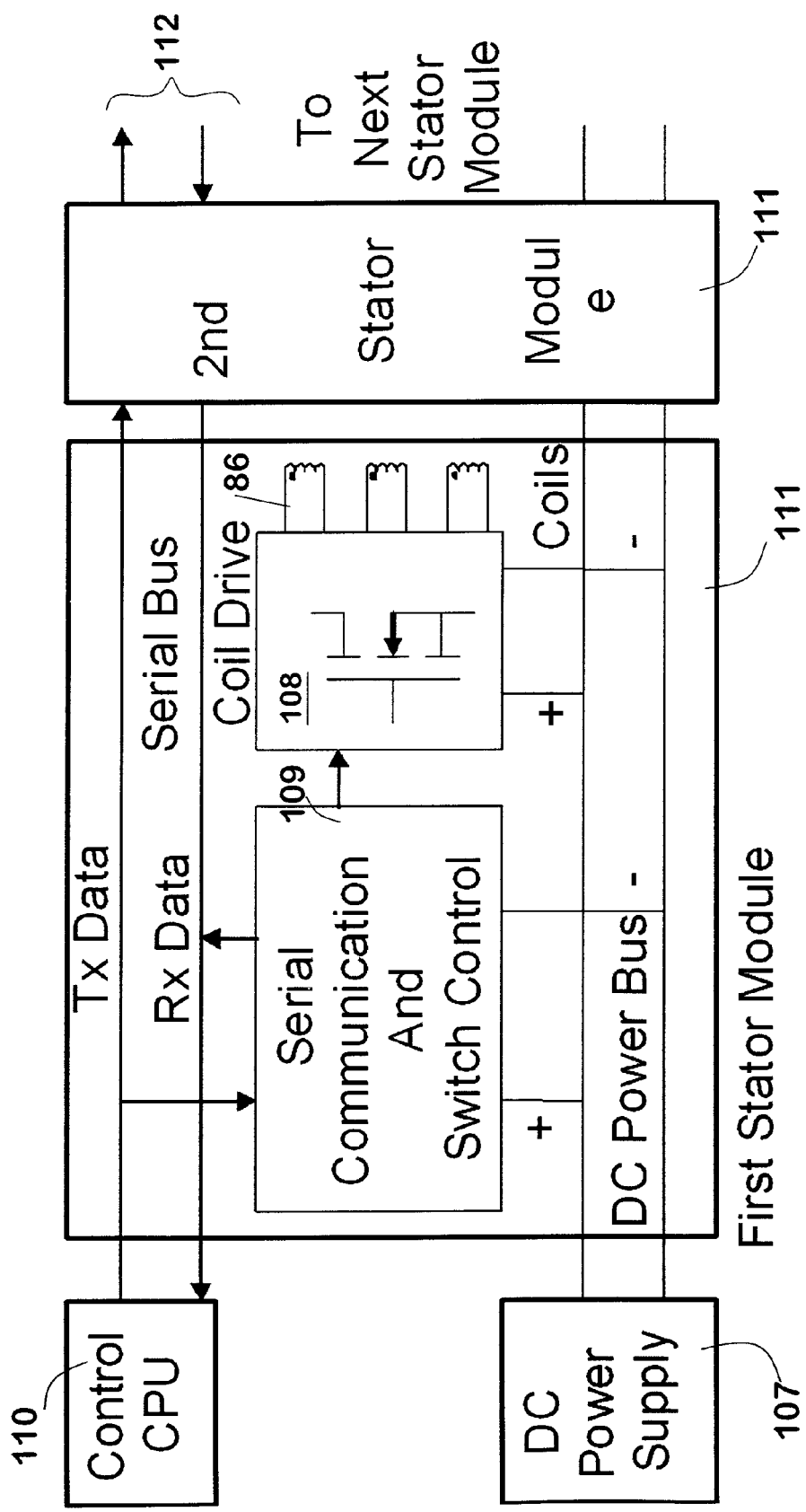
FIG. 26 is a schematic diagram of the alternate embodiment of the apparatus of the present invention in the form of a stator module electronics block diagram.

FIG. 26 is a block diagram illustrating the operation of the switched reluctance motor roller. This arrangement of the present invention is flexible. One or more stator coils are selectively energized and de-energized through the coil drive circuit 108 by a signal 109, such as a PWM signal. The control CPU 110, which may be a microprocessor, communicates with individual stator control modules 111, for example, one per stator base plate, over a serial bus 112 linking all the stator control modules. The serial bus includes a transmit line (Tx Data) and a receive line (Rx Data). The control CPU transmits command, control, and data request signals over the serial bus addressed to each stator control module 111. The stator modules respond with status, diagnostic, and other data, such as instantaneous coil current as measured by its coil drive circuit 108. In this way, the control CPU can coordinate control of the coils to rotate the belt rollers as required. Individual coils 86 can be controlled in both speed and direction for use in sortation, rotation, singulation, and transfer. The advantages are that these non-contact, i.e., no physical contact between the belt rollers and bearing surfaces in the conveyor frame, operations can be configured in software and could be mostly independent of belt speed. Any belt width or control length can easily be configured. The stator would be a modular construction with the inner connections made on a circuit board that is a part of the base plate 80. The stators would then be configured so as to tile the area under the conveyor belt 70 over which roller rotation or the desired trajectory of conveyed articles would operate. Interconnections between the modular stators would route communication and power to the stator drive circuits and to the next stator.

In most of the examples described in detail, the rollers were article-supporting rollers. But the magnetically-driven rollers could be rollers that do not even contact conveyed articles. For example, the magnetically-driven rollers could be used to drive other rollers or elements within a conveyor belt, or even the conveyor belt itself. And the rollers need not necessarily extend past either outer surface of the belt. As mentioned the rotors could be made of a metallic material for use with magnets in the conveyor frame or could be made of a magnetic material to interact with metallic elements strategically located in the frame, such as in the positions of the magnets used with non-magnetic rotors.

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A conveyor comprising:
    a conveyor belt having a plurality of rollers;
    a magnetic field passing through the conveyor belt and interacting with the rollers to affect the rotation of the rollers;
    a plurality of stationary magnets producing the magnetic field.

2. A conveyor as in claim 1 wherein the rollers include rotors with at least two poles.

3. A conveyor as in claim 2 wherein the poles are helical.

4. A conveyor as in claim 2 wherein the poles are linear.

5. A conveyor as in claim 2 wherein the rotors have clockwise parallel grooves and counterclockwise parallel grooves in their peripheries intersecting to provide segmented poles between the grooves.

6. A conveyor as in claim 2 wherein the stationary magnets comprise stators underlying the conveyor belt producing the magnetic field and forming switched reluctance motors with the rotors.

7. A conveyor as in claim 6 wherein the stators include coils and wherein the conveyor further comprises a coil drive circuit selectively energizing the coils to change the magnetic field.

8. A conveyor as in claim 1 wherein the stationary magnets are spaced apart along the conveyor and underlie the rollers in the conveyor belt.

9. A conveyor as in claim 8 wherein the magnets are electromagnets.

10. A conveyor as in claim 8 wherein the magnets are permanent magnets.

11. A conveyor as in claim 1 wherein the rollers are article-supporting rollers.

12. A conveyor as in claim 1 wherein the rollers are in-line rollers.

13. A conveyor as in claim 1 wherein the rollers are transverse rollers.

14. A conveyor as in claim 1 wherein the rollers are oblique rollers.

15. A conveyor as in claim 1 wherein the rollers rotate to push conveyed articles atop the rollers along the conveyor belt.

16. A conveyor belt as in claim 1 wherein the conveyor belt advances in the direction of belt travel through the magnetic field to cause the rollers to rotate.

17. A conveyor comprising:
a conveyor frame;
a conveyor belt advancing along the conveyor frame in a direction of belt travel and having a plurality of rollers, each having a rotor and an axis of rotation;
a plurality of stators positioned linearly along the direction of belt travel in the conveyor frame proximate the conveyor belt to couple magnetic fields to the rotors of the plurality of rollers and form switched reluctance motors with the rotors;
wherein the rollers are controlled by the switched reluctance motors to rotate about their axes of rotation as the rollers encounter the magnetic fields produced by the switched reluctance motors.

18. A conveyor belt as in claim 17 wherein the stators are located underneath the conveyor belt.

* * * * *

UNITED STATES PATENT AND TRADEMARK OFFICE
CERTIFICATE OF CORRECTION

PATENT NO. : 8,511,460 B2
APPLICATION NO. : 12/725173
DATED : August 20, 2013
INVENTOR(S) : Bryant G. Ragan et al.

Page 1 of 1

It is certified that error appears in the above-identified patent and that said Letters Patent is hereby corrected as shown below:

In the Specification column 4, line 29: delete "angled roller" and substitute --angled-roller--.

In the Claims column 10, in claim 1, line 43: insert --advanceable in a direction of belt travel and-- between "belt" and "having".

column 10, in claim 1, line 45: delete "affect" and substitute --effect--.

column 11, in claim 16, line 16: delete "belt" between "conveyor" and "and".

Signed and Sealed this
First Day of October, 2013

Teresa Stanek Rea
*Deputy Director of the United States Patent and Trademark Office*